US010560178B2

(12) United States Patent
Graham, III et al.

(10) Patent No.: US 10,560,178 B2
(45) Date of Patent: Feb. 11, 2020

(54) MILLIMETER WAVE COMMUNICATION SYSTEM FEATURING ADJUSTABLE SUPPORT

(71) Applicant: AirVine Scientific, Inc., Bella Vista, CA (US)

(72) Inventors: Hatch Graham, III, Bella Vista, CA (US); Harry William Peterson, Concord, CA (US)

(73) Assignee: AIRVINE SCIENTIFIC, INC., Bella Vista, CA (US)

( * ) Notice: Subject to any disclaimer, the term of this patent is extended or adjusted under 35 U.S.C. 154(b) by 0 days.

(21) Appl. No.: 15/921,098

(22) Filed: Mar. 14, 2018

(65) Prior Publication Data

US 2018/0269957 A1 Sep. 20, 2018

Related U.S. Application Data

(60) Provisional application No. 62/473,326, filed on Mar. 18, 2017.

(51) Int. Cl.

| | |
|---|---|
| ***H04B 7/185*** | (2006.01) |
| ***H04B 7/15*** | (2006.01) |
| ***H01Q 21/29*** | (2006.01) |
| ***H04B 1/38*** | (2015.01) |
| ***H01Q 3/08*** | (2006.01) |

(52) U.S. Cl.

CPC ................ *H04B 7/15* (2013.01); *H01Q 3/08* (2013.01); *H01Q 21/293* (2013.01); *H04B 1/38* (2013.01)

(58) Field of Classification Search

CPC ..... H04W 4/33; H04B 7/0617; H04B 7/0695; H04B 7/0413; H04B 3/58; H04B 7/0408; H04B 7/15; H04B 2203/5445

USPC ................................................ 455/13.1, 41.1

See application file for complete search history.

(56) References Cited

U.S. PATENT DOCUMENTS

| | | | |
|---|---|---|---|
| 7,065,350 | B2 | 6/2006 | Capobianco et al. |
| 2003/0157908 | A1 | 8/2003 | Dalal |

(Continued)

FOREIGN PATENT DOCUMENTS

| | | | |
|---|---|---|---|
| EP | 3133847 | A1 | 2/2017 |

OTHER PUBLICATIONS

K. Loshokov, PCT Search Report and Written Opinion of the International Searching Authority, Intl. Appl. No. PCT/US2018/019939, dated Nov. 15, 2018, 7 pages.

(Continued)

*Primary Examiner* — Tu X Nguyen

(74) *Attorney, Agent, or Firm* — Gavrilovich, Dodd & Lindsey LLP

(57) ABSTRACT

Apparatuses, systems, and methods for wireless millimeter-wave communications are disclosed. An apparatus is configured to rotate about an axis so as to improve transfer of wireless signals. The apparatus includes a support having a first side and a second side. A first phased array antenna is mounted to the support facing away from the first side. A second phased array antenna mounted to the support facing away from the second side. The apparatus further includes a means for rotating the support, such as a hinge or a pivot. By rotating the support in the field, the coverage of the wireless signals to/from at least one of the phased array antennas may be improved.

17 Claims, 22 Drawing Sheets

(56) References Cited

U.S. PATENT DOCUMENTS

| | | | | |
|---|---|---|---|---|
| 2004/0110469 | A1 * | 6/2004 | Judd | G01S 19/25 455/15 |
| 2004/0174900 | A1 | 9/2004 | Volpi et al. | |
| 2010/0231452 | A1 | 9/2010 | Babakhani et al. | |
| 2011/0038356 | A1 | 2/2011 | Bachrach | |
| 2011/0300885 | A1 | 12/2011 | Darabi et al. | |
| 2012/0135724 | A1 | 5/2012 | Lewis et al. | |
| 2014/0376431 | A1 | 12/2014 | Li | |
| 2016/0037431 | A1 | 2/2016 | Kohli | |
| 2016/0112970 | A1 | 4/2016 | Chen et al. | |
| 2016/0134356 | A1 * | 5/2016 | Rappaport | H04B 7/15507 370/315 |
| 2016/0233580 | A1 | 8/2016 | Aparin et al. | |
| 2017/0098889 | A1 | 4/2017 | Henry et al. | |

OTHER PUBLICATIONS

T. Vladimirova, PCT Search Report and Written Opinion of the International Searching Authority, Intl. Appl. No. PCT/US2018/019931, dated Jun. 28, 2018, 7 pages.

Z. Nabieva, PCT Search Report and Written Opinion of the International Searching Authority, Intl. Appl. No. PCT/US2018/022422, dated Jun. 21, 2018, 6 pages.

Robert E. Wallis et al., "Tesing of the MESSENGER Spacecraft Phased-Array Antenna," IEEE Antennas and PRopagation Magazine, Vo. 47, Issue 1, pp. 204-209, Jul. 18, 2005.

T. Ivanova, PCT Search Report and Written Opinion of the International Searching Authority, Intl. Appl. No. PCT/US2018/027946, dated Jul. 9, 2018, 7 pages.

* cited by examiner

MILLIMETER WAVE COMMUNICATION SYSTEM FEATURING ADJUSTABLE SUPPORT

CROSS REFERENCE TO RELATED APPLICATIONS

This Application claims the benefit of U.S. Provisional Patent Application Ser. No. 62/473,326, filed on Mar. 18, 2017, which is incorporated by reference herein in its entirety. This Application is also related to U.S. patent application Ser. No. 15/906,148, entitled "High Speed Wireless Data Network," filed Feb. 27, 2018, which is incorporated by reference herein in its entirety; and this Application is also related to U.S. patent application Ser. No. 15/906,161, entitled "Millimeter Wave Communications Through Obstructions," filed Feb. 27, 2018, which is incorporated by reference herein in its entirety.

TECHNICAL FIELD

This disclosure generally relates to wireless communications, and more particularly, to wireless communication networks capable of operating in the millimeter wave spectrum.

BACKGROUND

The millimeter wave spectrum is the frequency band of spectrum between 30 GHz and 300 GHz. This spectrum can be used for high-speed wireless communications as seen with the latest IEEE 802.11ad Wi-Fi standard (operating at 60 GHz).

V-Band is a set of millimeter wave frequencies used for communication. Regulatory authorities in some countries permit unlicensed V-Band operation. The set of frequencies over which unlicensed V-Band operation is permitted in the U.S. is currently 57 to 71 GHz. Standards applicable to V-Band communications include IEEE 802.11ad (released 28 Dec. 2012) and IEEE 802.11ay (currently under development).

E-Band is another set of millimeter wave frequencies usable for communication. Regulatory authorities, e.g., the Federal Communications Commission (FCC), generally permit lightly-licensed operation in this band. In the U.S., E-Band operation is permitted in the following frequency bands of 71-76, 81-86, and 92-95 GHz.

The FCC also regulates numerous other unlicensed bands, including Industrial, Scientific, and Medical (ISM) bands at approximately 2 GHz and 6 GHz and other frequencies. In recent years, some of the fastest-growing uses of the ISM bands and other lightly licensed or unlicensed bands have been for short-range, low-power wireless communications systems, referred to commonly as WiFi.

A problem with some wireless networks, particularly those operating at millimeter wave frequencies, is the ability for wireless signals to penetrate obstructions, such as walls or floors within buildings or other barriers. Although millimeter-wave signals can and do pass through some obstructions, they are often degraded by doing so. Degradation may be due to attenuation, reflection and other physical processes caused by the obstruction. As frequency of transmission increases, attenuation by obstacles and free space also increases. The result is a reduction of received power, thereby limiting signal range and ability to penetrate obstructions.

Another issue is that in some systems, the millimeter-wave signals are highly directional, relatively narrow beams that do not spread over an expansive region.

SUMMARY

Disclosed herein are one or more apparatuses, systems, and methods that allow millimeter-wave signals to pass efficiently and reliably through obstructions, such as walls, barriers, free space, or the like, with significantly increased performance. Additionally/alternatively, the aforementioned may be configured to adjust the direction of millimeter-wave signals used for communications. These apparatuses, systems, and methods can greatly improve the reliability and performance of wireless millimeter-wave communication within buildings or other structures.

A disclosed exemplary apparatus capable of millimeter wireless communications includes a support having a first side and a second side. The apparatus also include a first phased array antenna mounted to the support facing away from the first side; a second phased array antenna mounted to the support facing away from the second side; and a means of rotating the support. This configuration may help to better direct the millimeter signals along a desired path.

A disclosed exemplary system capable of millimeter wireless communications includes a first support and a second support. A first phased array antenna may be mounted to the first support so that the first phased array antenna faces away from the second support. A second phased array antenna may be mounted to the first support so that the second phased array antenna faces toward the second support. A third phased array antenna may be mounted to the second support so that the third phased array antenna faces toward the first support. A fourth phased array antenna may be mounted to the second support so that the fourth phased array antenna faces away from the first support. A pivot allows at least one of the first support or the second support to turn.

An example method of wireless communication is also disclosed. The method includes: rotating a support having a first phased array antenna and a second phased array antenna about a pivot; receiving at the first phased array antenna a first millimeter wave signal carrying data; transferring the data through a first transceiver to the second phased array antenna; transmitting through an obstruction, using the second phased array antenna, a second millimeter wave signal carrying the data; receiving the second millimeter wave signal at a third phased array antenna located at an opposite side of the obstruction from the second phased array antenna; transferring the data through a second transceiver to a fourth phased array antenna; and transmitting from the fourth phased array antenna, a third millimeter wave signal carrying the data.

The foregoing summary does not define the limits of the appended claims. Other aspects, embodiments, features, and advantages will be or will become apparent to one with skill in the art upon examination of the following figures and detailed description. It is intended that all such additional features, embodiments, aspects, and advantages be included within this description and be protected by the accompanying claims.

BRIEF DESCRIPTION OF DRAWINGS

It is to be understood that the drawings are solely for purpose of illustration and do not define the limits of the appended claims. Furthermore, the components in the figures are not necessarily to scale. In the figures, like reference numerals designate corresponding parts throughout the different views.

DETAILED DESCRIPTION

The following detailed description, which references to and incorporates the drawings, describes and illustrates one or more examples of a wireless communication system, apparatus, and method, as well as exemplary components of such wireless communication systems. These examples, offered not to limit, but only to exemplify and teach embodiments of the components, systems, and methods, are shown and described in sufficient detail to enable those skilled in the art to practice what is claimed. Thus, where appropriate to avoid obscuring the invention, the description may omit certain information known to those of skill in the art. The disclosures herein are examples that should not be read to unduly limit the scope of any patent claims that may eventual be granted based on this application.

The word "exemplary" is used throughout this application to mean "serving as an example, instance, or illustration." Any system, method, device, technique, feature or the like described herein as "exemplary" is not necessarily to be construed as preferred or advantageous over other features.

As used in this specification and the appended claims, the singular forms "a," "an," and "the" include plural referents unless the content clearly dictates otherwise.

Also, the use of "or" means "and/or" unless stated otherwise. Similarly, "comprise," "comprises," "comprising" "include," "includes," and "including" are interchangeable and not intended to be limiting.

The disclosed wireless communication systems can operate in the millimeter frequency spectrum and use phased array antennas (PAAs) with beamformers to provide very high data rates to and from end devices.

Figure 1:
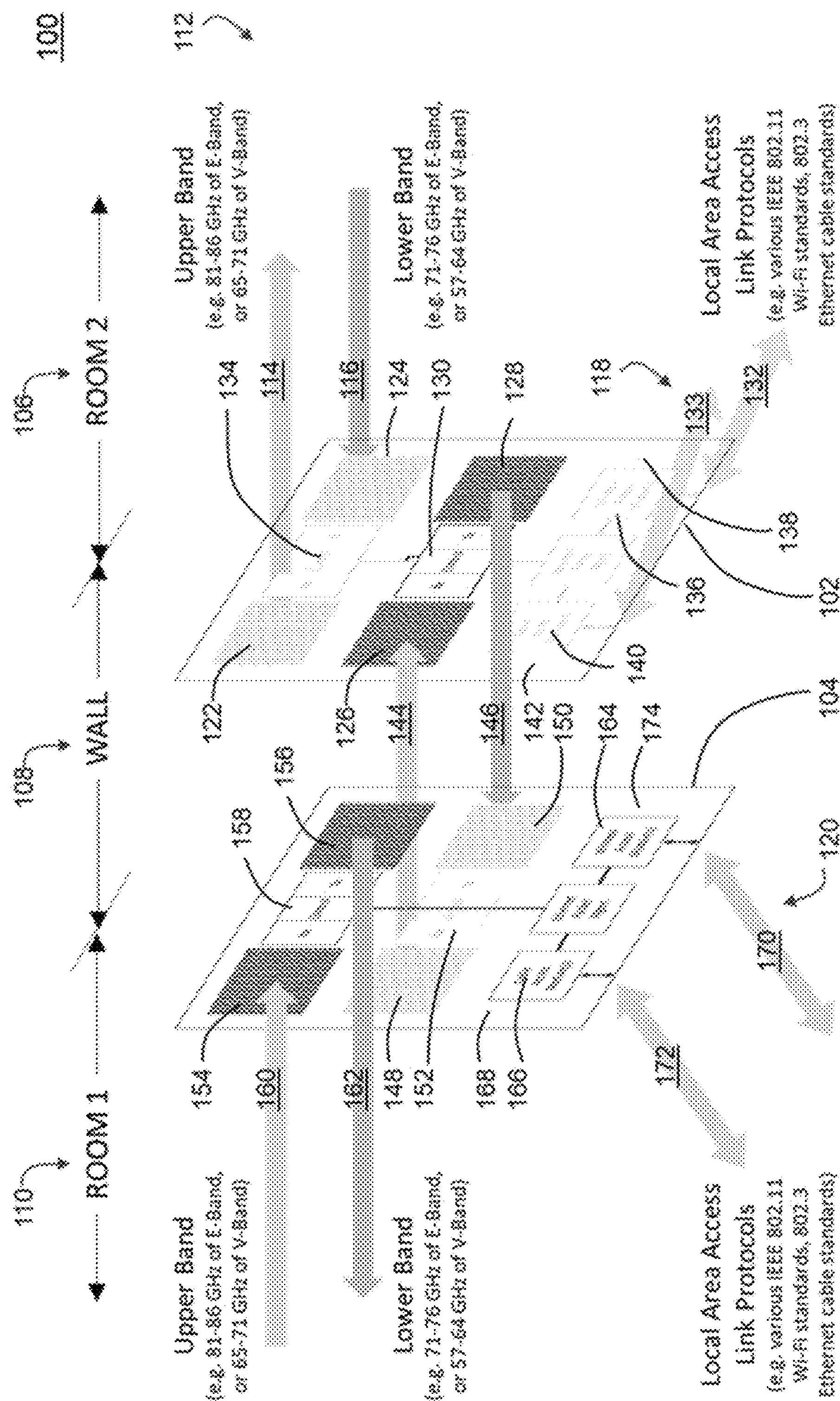
FIG. 1 is a first schematic perspective view of a first exemplary wireless communication system.

FIG. 1 is a schematic illustration of an exemplary wireless communication system 100. The system 100 includes two apparatuses (e.g., panels 102, 104), each configured to send millimeter-wave wireless signals over a wireless link through one or more obstructions, such as walls, barriers, other structures, through unobstructed air, or the like. Millimeter-wave signals can and do pass through certain obstructions, such as build walls, but the signal strength or quality may be degraded. Degradation can be caused to attenuation, reflection and/or other physical processes occurring between the obstruction and the wireless signal. Likewise, moisture content within air (humidity) also contributes to a reduction of received signal power. The wireless communication system 100 allows millimeter-wave signals to pass efficiently and reliably through one or more obstructions, with reduced degradation. Accordingly, the system 100 may improve the reliability of wireless millimeter-wave communication across increased line-of-sight range, and through obstructions, such as those found within buildings or other manmade structures.

In the example shown in FIG. 1, the first panel 102 is mounted on one side of a wall 108 (not shown), and the second panel 104 is mounted on the opposite side of the wall 108. The first and second panel 102, 104 may be generally aligned with each other. The panels 102, 104 may each include any suitable means for attaching to the wall 108, including hooks, adhesives, mounts, fasteners such as screws or nails, eyelets, wires, or the like. Furthermore, panels 102 or 104 may be mounted from overhead, such as from the ceiling, or mounted atop a floor stand (with no wall contact in either case).

The panels 102, 104 may each include or be a support for components of the panels 102, 104, respectively. For example, the panels 102, 104 may each include one or more printed circuit boards, such as a multilayer boards, ceramic multilayer boards, or the like upon which components may be mounted and connected together as appropriate, where the board may act as a support, at least in part. The components may also/alternatively be mounted within the panel substrate, such as buried in the layers of the boards. The panels 102, 104 may also each include one or more housings, frames, or casings or any combination of the aforementioned that may act as supports.

The first panel 102 includes a first set of antennas having a first receiving phased array antenna (PAA) 126 directed toward the wall 108, and a first transmitting PAA 128 also directed toward the wall 108. The first PAAs 126, 128 are each in communication with a first millimeter-wave transceiver 130 included in the first panel 102. The first PAAs 126, 128 are configured to receive and transmit millimeter-wave signals 144, 146, respectively, through the wall 108 from and to corresponding first PAAs 148, 150 included on the second panel 104 as a first set of antennas. Similar to the first panel 102, the first PAAs 148, 150 are each directed toward the wall 108 and in communication with a first millimeter-wave transceiver 152 included in the second panel 104. The millimeter-wave signals 144, 146 may carry data, such as communication information, between the two panels 102, 104.

Although the signals 144, 146 of the wireless link passing through the wall 108 may be any suitable frequency band, in the example shown, the first signal 144 is in the upper portion of the V-Band between 65-71 GHz, and the second signal 146 is in the lower portion of the V-Band between 57-64 GHz. The use of multiple communication bands within a given wireless link has advantages in that it may increase reliability, increase available bandwidth and improve compatibility of the system 100.

The panels 102, 104 may communicate with other networked panels by wirelessly transferring data to other similarly configured wireless systems located nearby using millimeter-wave wireless signals. In the example shown in FIG. 1, this is done by wirelessly transmitting and receiving millimeter-wave beams 114, 116, 160, 162 within room 1 110 and room 2 106, respectively. To accomplish this, the first panel 102 includes a second set of antennas having a second transmitting PAA 122 directed toward room 2 106, and a second receiving PAA 124 also directed toward room 2 106. The second PAAs 122, 124 are each in communication with a second millimeter-wave transceiver 134 included in the first panel 102. The second PAAs 122, 124 are configured to transmit and receive millimeter-wave beams 114, 116, respectively, in the room 2 106. The millimeter-wave beams 114, 116 may carry data, such as communication information, between the first panel 102 and other networked devices (not shown). A controller included in the first panel 102 may be adapted to manage data transfer and flow between the first wireless transceiver 130 and the second wireless transceiver 134. One or more data busses of the first panel 102 may couple the transceivers 130, 134 and other components.

Although the beams 114, 116 of the wireless link passing through room 2 106 may be any suitable frequency band, in the example shown, the transmitted beam 114 is in the upper portion of the V-Band between 65-71 GHz, and the received beam 116 is in the lower portion of the V-Band between 57-64 GHz.

To permit millimeter-wave communications in room 1 110, the second panel 104 includes a second set of antennas having a second transmitting PAA 156 directed toward room 2 110 and a second receiving PAA 154 also directed toward room 1 110. The second PAAs 154, 156 are each in communication with a second millimeter-wave transceiver 158 included in the second panel 104. The second PAAs 154, 156 are configured to receive and transmit millimeter-wave beams 160, 162, respectively, in the room 1 110. The millimeter-wave beams 160, 162 may carry data, such as communication information, between the second panel 104 and other networked devices (not shown). A controller included in the second panel 104 may be adapted to manage data transfer and flow between the first wireless transceiver 152 and the second wireless transceiver 158. One or more data busses of the second panel 104 may couple the transceivers 152, 158 and other components.

Although the beams 160, 162 of the wireless link passing through room 1 110 may be any suitable frequency band, in the example shown, the transmitted beam 162 is in the lower portion of the V-Band between 57-64 GHz, and the received beam 160 is in the upper portion of the V-Band between 65-71 GHz The controllers in each panel 102, 104 may be configured so that a fully-duplexed wireless communication path 112 is available through the wall 108 and rooms 106, 110 by way of the antennas 122, 124, 126, 128, 148, 150, 154, 156 and panel transceivers 130, 134, 152, 158. In certain modes of operations, the controllers in each panel 102, 104 may be configured so that the system 100 acts as a wireless repeater, capable of wirelessly passing information between rooms 1 and 2 through wall 108.

Each of the panels 102, 104 may also include local wireless and/or cable interfaces, e.g., access control units (ACUs) 142, 174, respectively, for communicating with one or more terminal networked devices in room 2 and 1, respectively. Each of the local interfaces may include an access control unit (ACU) that includes certain functions and components that serve to manage and deliver data packets, e.g., Ethernet packets, of information from the wireless communication path 112 to terminals in the local rooms 1 and 2 (rooms 110 and 106) of the panel locations. Similarly, the ACU functions and components serve to receive information from the local terminals and insert the packets of information into the information flow over the wireless communication path 112.

The components of the ACU of the first panel 102 may include an Ethernet packet manager 136 and one or more access modules, e.g., a wireless access module 140 and a cable access module 138. The components of the ACU of the second panel 104 may include an Ethernet packet manager 166 and one or more access modules, e.g., a wireless access module 164 and a cable access module 168. Software/firmware may also be used to control communications between the modules and the packet manager in each panel 102, 104 over respective data busses. The Ethernet packet managers 136, 166 may each be implemented using a commercially-available Ethernet switch, such as an Ethernet switch available from Cavium, Inc. The access modules 138, 140, 164, 168 in each panel 102, 104 may each include commercially-available chipsets and/or software/firmware that implement standards-based local communication protocols, such as one or more of the IEEE 802.11 Wi-Fi standards or IEEE 802.3 Ethernet cable standards. Each of the ACUs may also include one or more antennas and/or cable ports As shown in FIG. 1, each Ethernet packet manager 136, 166 is coupled to the transceiver 130, 134, 152, 158, in its respective panel 102 or 104 by one or more data busses.

The functions of the ACU in each panel may include a 1) Ethernet switch and associated packet management buffers, buses, and memory, 2) wireless modules (transceivers) that adhere to IEEE 802.11 protocol (various versions of 802.11 depending on the panel configuration), and 3) Ethernet ports for cable connections. In each panel 102, 104, data that is transmitted and received from the bus from the upper two transceivers 130, 134, 152, 158 is encapsulated Ethernet packet information at a baseband frequency. The Ethernet processor in each packet manager 136, 166 de-encapsulates the data, decides if its destination is within the local area its respective room (based on destination address information included in the packet). If not, the packet manager sends the packet back up to the transceivers 130, 134, 152, 158 so that the packet continues its journey on the wireless communication path 112. If the data's destination is the local area, a controller included in the respective packet manager 136, 166 determines whether it is to be sent over a wireless access module or out the Ethernet port of a cable access module. Conversely, information (data packets) that comes inbound from the local end terminal devices is encapsulated into one or more Ethernet packets by the ACU and placed up and on its way to the upper transceivers so that it may be transferred on the wireless communication path 112.

Although FIG. 1 shows ACUs including both wireless and cable access modules, any suitable configuration of access modules may be used in each panel. For example, only one wireless access module may be included in some panel configurations with no cable access module. Other panel configurations may include only one or more cable access modules with no wireless access module, while other panel configurations may include three or more access modules, either wired or wireless.

Although the local access communication paths 118, 120 may each be any suitable frequency band or protocol, in the example shown, the local wireless paths 132, 170 may each be IEEE 802.11 Wi-Fi signals (any suitable version of Wi-Fi), Bluetooth, or the like; and the local wired paths 133, 172 may each be IEEE 802.3 Ethernet signals or the like. Alternatively, the local communication paths 118, 120 may comply with any suitable FCC and International agency wireless and cable standards.

The wireless interfaces 142, 174 may be omitted from the first and second panels 102, 104 in some configurations of the system 100.

The controller included in each of the panels 102, 104 may be any suitable means for controlling the operation of the respectively panel, as well as the system 100. For example, the controller may include one or more processors for executing instructions or code, such as one or more digital signal processors (DSPs), general purpose microprocessors, application specific integrated circuits (ASICs), field programmable logic arrays (FPGAs), or other equivalent integrated or discrete logic circuitry. The controller may also include memory. The memory and processor may be combined as a single chip.

The functions of the controller may be implemented in hardware, software, firmware, or any suitable combination thereof. If implemented in software, the functions may be stored as one or more instructions or code on a computer-readable medium (e.g., memory) and executed by a hardware-based processing unit (e.g., a processor). Computer-readable media may include any computer-readable storage media, including data storage media, which may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disc storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

The data busses described herein may be high-speed digital busses constructed from commercially-available components, including commercially-available hardware, software and/or firmware. Alternatively/additionally, one or more of the data busses may include custom components for providing high-speed data transfers.

Figure 2A:
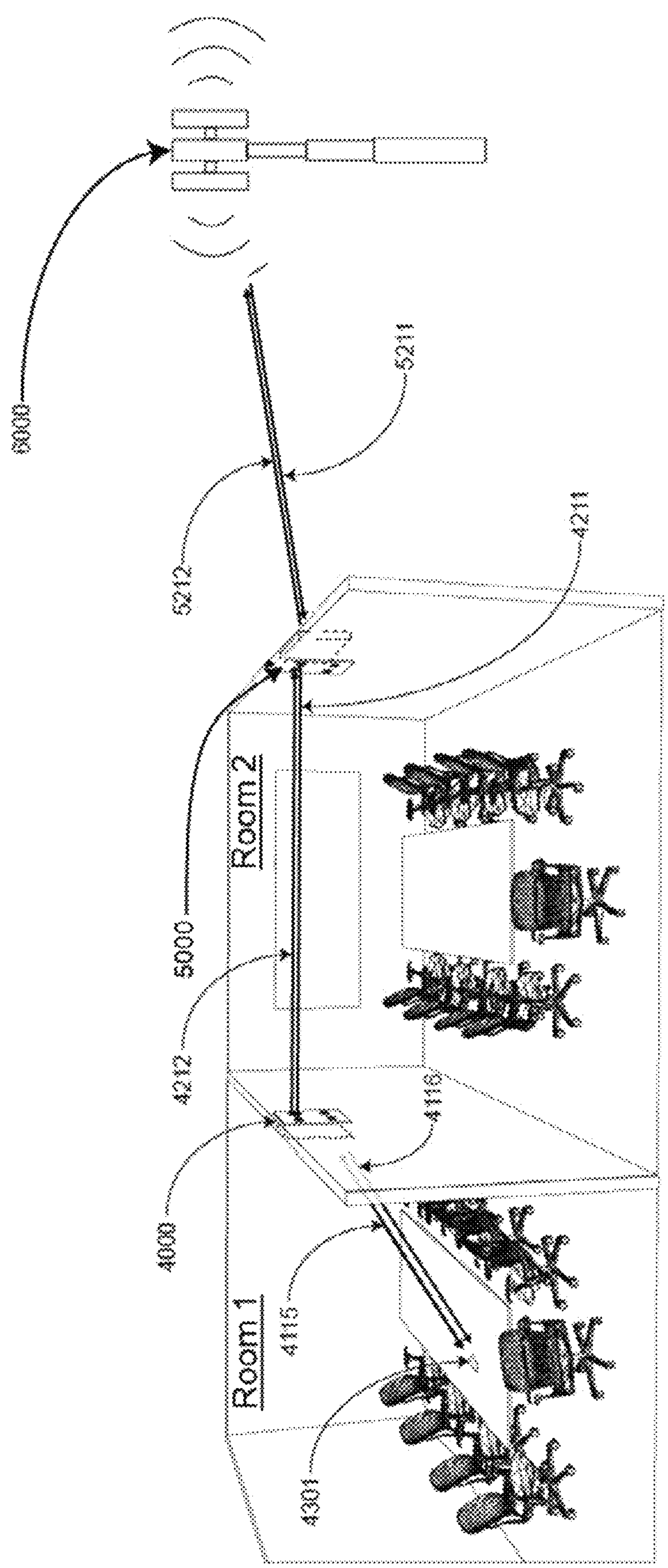
FIG. 2*a* is a contextual schematic illustration of a first exemplary wireless communication network in an enterprise environment, which includes a disclosed wireless communication system.

FIG. 2*a* is a contextual schematic illustration of an exemplary wireless communication network in an enterprise environment, which includes one or more of the disclosed wireless communication systems. The network includes two wireless systems 4000, 5000 each configured to provide wireless millimeter-wave communications through obstructions, such as walls, in an exemplary enterprise. The system 4000 is mounted on an interior wall. The system 5000 is mounted on an exterior wall. Each of the systems 4000, 5000 may include any of the two-panel wireless communication systems disclosed herein, for example, the system 100 disclosed in connection with FIG. 1 or system 4000 described in further detail below.

As shown in FIG. 2*a*, the system 4000 is installed on the interior wall between room 1 and room 2. Installation does not require actually cutting a hole in the wall. This is particularly advantageous in situations where walls contain asbestos or other materials that generate hazardous dust when cut, drilled or abraded. Installation can be achieved by simply attaching the two panels which comprise system 4000 to either side of the wall. The attachment of panels to the wall may be performed using any suitable means, for example, by adhesive or using nails, screws, hooks, eyelets or the like. The two panels may be aligned in order achieve optimal performance. The panel alignment may be achieved by use of built-in auto-alignment circuitry included in the panels of the system 4000 or by portable instrumentation developed to aid the alignment procedure.

The system 5000 serves as gateway for the enterprise buildings, as it allows communications from the enterprise to the Internet cloud via an external device, for example an enterprise server or a remote base station 6000. In this example, millimeter-wave beams 5211 and 5212 comprise a duplex frequency domain division (FDD) connection between the first system 5000 of the enterprise network and the Internet cloud via a remote base station 6000. Although the beams 5211, 5212 of the wireless link between system 5000 and base station 6000 may be any suitable frequency band, in the example shown, the transmitted beam (uplink) 5212 may be in the E-Band between 81-86 GHz, and the received beam (downlink) 5211 may be in the E-Band between 71-76 GHz.

A second wireless link between system 5000 and system 4000 allows communications between the two systems 4000, 5000. In this example, millimeter-wave beams 4211, 4212 of the second link provide a duplex FDD connection between the first system 5000 and the second system 4000. Although the beams 4211, 4212 of the second wireless link may be any suitable frequency band, in the example shown, the transmitted beam 4212 from the second system 4000 to the first system 5000 may be in the E-Band between 81-86 GHz, and the received beam 4211 from the first system 5000 to the second system 4000 may be in the E-Band between 71-76 GHz.

The first panel (in Room 1) of the second system 4000 provides additional links 4115 to one or more terminal devices 4301 in the second room. The terminal devices 4301 may be any wirelessly enabled device, for example, a computer such as a laptop, smartphone, cable box, gaming console, or non-wireless terminals equipped with standard Ethernet interface ports.

Figure 2B:
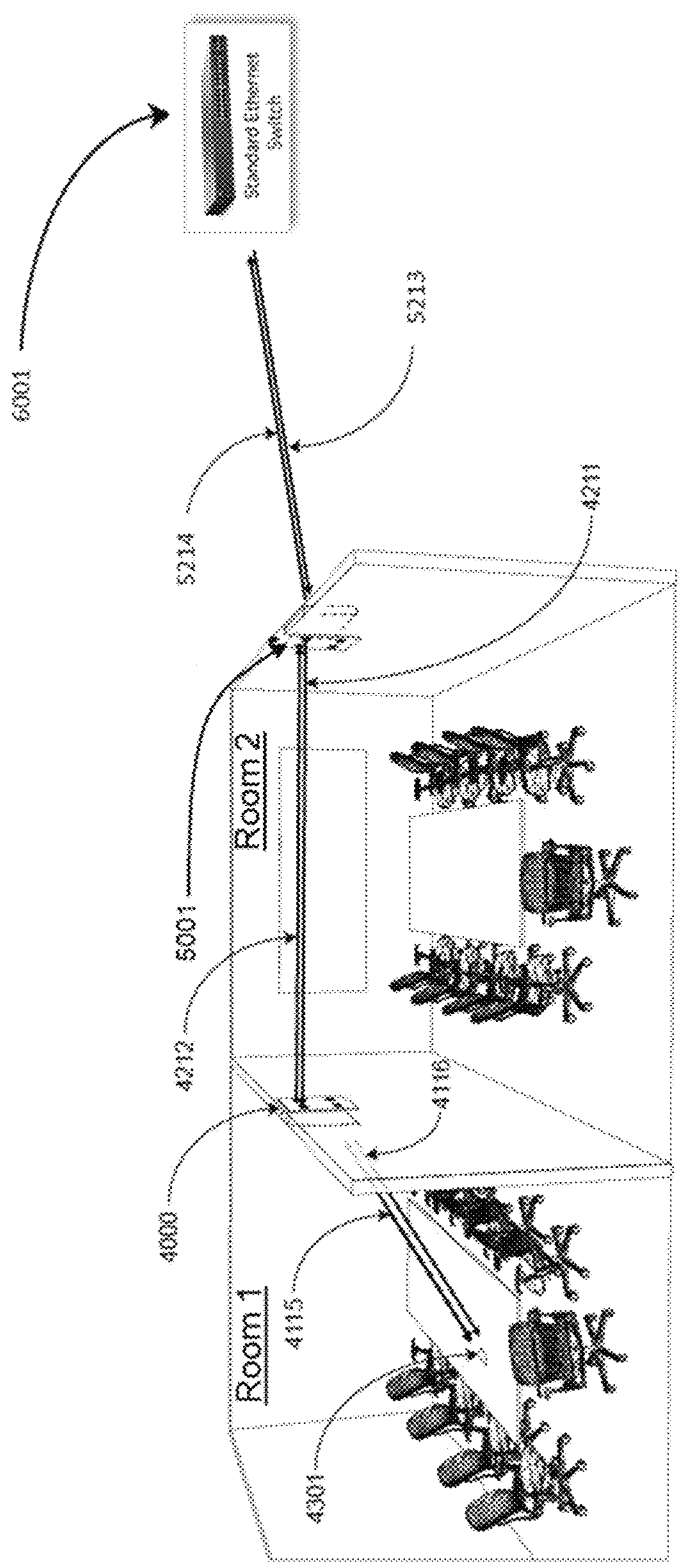
FIG. 2*b* is a contextual schematic illustration of a second exemplary wireless communication network in an enterprise environment, which includes a disclosed wireless communication system.

FIG. 2*b* is a contextual schematic illustration of an exemplary wireless communication network in an enterprise environment, which includes one or more of the disclosed wireless communication systems. The network includes two wireless systems 4000, 5001 each configured to provide wireless millimeter-wave communications through obstructions, such as walls, in an exemplary enterprise. Similar to FIG. 2*a*, the system 4000 is mounted on an interior wall. However, in the example of FIG. 2*b*, the system 5001 is also mounted on an interior wall and connects to a gateway in the configuration of a standard Ethernet switch 6001. In this manner, switch 6001 serves as the gateway for the enterprise infrastructure, as it allows communications from the enterprise to the Internet cloud via the switch 6001.

Each of the systems 4000, 5001 may include any of the two-panel wireless communication systems disclosed herein, for example, the system 100 disclosed in connection with FIG. 1 or systems 4000, 7000 described in further detail below.

Figure 3:
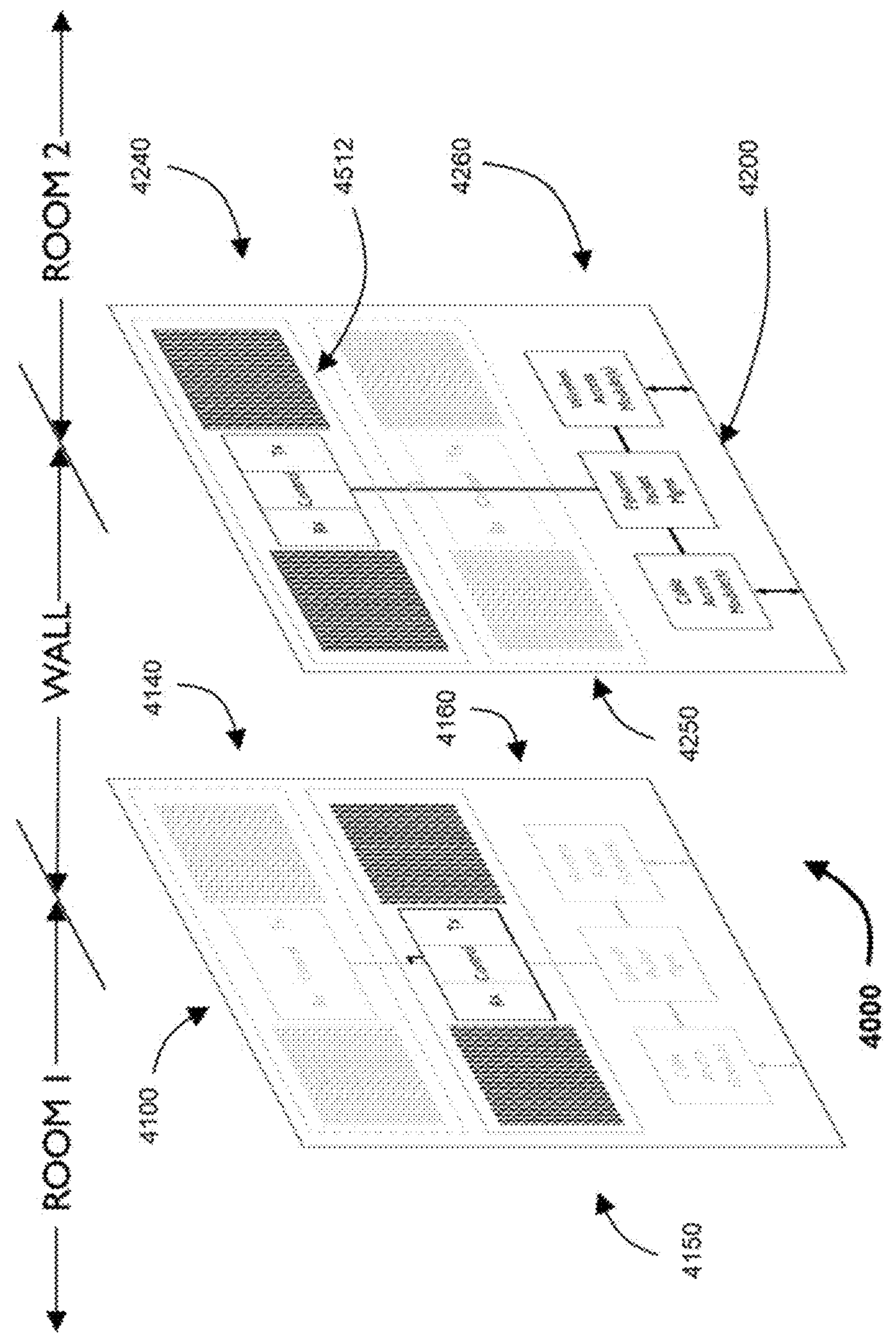
FIG. 3 is a second schematic perspective view of the first exemplary wireless communication system of FIG. 1, includable in the wireless networks disclosed herein.

FIG. 3 is a second schematic perspective view of an exemplary wireless communication system 4000 includable in the wireless networks disclosed herein, e.g., the network shown in FIGS. 2*a-b*. The system 4000 may include the same components and functions of the system 100 shown in FIG. 1. The system 4000 may be replicated and used as both systems 4000, 5001 of the network depicted in FIG. 2*b*.

The system 4000 includes two separate panels 4100, 4200, which are each mounted to opposite sides of a wall separating room 1 and room 2, respectively. The panels 4100, 4200 are substantially aligned with each other so that millimeter-wave signals can be successfully transfer data between the panels 4100, 4200 through the wall. The system 4000 may be installed on two sides of a wall that separates room 1 and room 2. The height of the installation may be seven feet above the floor, but installation height is not constrained to any height.

Installation, alignment, and configuration of the system 4000 may be controlled by a separate wand or handheld device that is in wireless communication with the panels 4100, 4200. The wand may include a user interface, a display, and a Bluetooth interface that can pair with each panel 4100, 4200. For example, the wand may be a smartphone with an operating system and application software for interfacing with the panels 4100, 4200.

Installation and alignment of the panels 4100, 4200 on a wall can be accomplished using the following method: 1) panel 4100 is attached to the wall, and connected to power (wall outlet) and turned on; 2) using the Bluetooth link, the panel 4100 and wand are paired; 3) the second panel 4200 is temporarily attached to the other side of the wall, and connected to power (wall outlet) and turned on; 4) the second panel 4200 is moved on the wall until a green "Alignment OK" indicator is displayed by the wand; 5) the second panel 4200 is then permanently attached to the wall; 6) a "join network" button is pushed on the wand, causing the first and second panel 4100, 4200 to establish communications between each other and other network elements over the wireless links; and 7) the wand displays an "Installation OK" message once the panels 4100, 4200 communicate to the wand over the Bluetooth link that they have successfully connect to the network.

Once installed, the panels 4100 and 4200 make up the system 4000.

The system 4000 may transmit and receive information at V-Band or E-Band frequencies to/from room 1 and room 2. The system 4000 may also transmit and receive Ethernet packet traffic within room 1 and room 2 via wireless or cable access control units (ACUs) 4260, 4160.

In this example, each of the panels 4100, 4200 contains two circuits of phased array antennas with embedded transceiver and control electronics (PAAXs) and one ACU. With the advent of deep submicron CMOS technology, phased array antennas with embedded transceiver and control electronics (PAAX) have become a practical implementation.

The first panel 4100 includes a first PAAX 4140 (which may include components 154, 156, 158 of FIG. 1), a second PAAX 4150 (which may include components 148, 150, 152 of FIG. 1), and an ACU 4160 (which may include components of ACU 174 of FIG. 1). The first PAAX 4140 has two phased array antennas on one side of the panel 4100 directed toward room 1. The second PAAX 4150 has two phased array antennas on the other side of the panel 4100 facing the wall. The ACU 4160 has Ethernet packet management, wireless and cable interface modules for linking to terminals within the rooms, as described in connection with FIG. 1.

Likewise, the second panel 4200 includes a first PAAX 4240 (which may include components 122, 124, 134 of FIG. 1), a second PAAX 4250 (which may include components 126, 128, 130 of FIG. 1), and an ACU 4260 (which may include components of ACU 142 of FIG. 1). The first PAAX 4240 has two phased array antennas on one side of the panel 4200 directed toward room 2. The second PAAX 4250 has two phased array antennas on the other side of the panel 4200 facing the wall. The ACU 4260 has Ethernet packet management, wireless and cable interface modules for linking to terminals within the rooms.

The system 4000 may be configured so that the first panel 4100 provides full duplex FDD on the V-Band or E-Band frequencies using the first PAAX 4140 in room 1; and full duplex FDD on the V-Band or E-Band frequencies using the second PAAX 4150 through the wall. And the second panel 4200 provides full duplex FDD on the V-Band or E-Band frequencies using its first PAAX 4240 in room 2; and full duplex FDD on the V-Band or E-Band frequencies using the second PAAX 4250 through the wall.

Each PAAX has control circuitry for electrically setting beamformer parameters. Beamformer parameters may control either the width of the beam, or the direction in which the beamformer points, or both. The control may be asserted by the following means: 1) embedding switches within the PAA and using such switches to reconfigure conductive elements which comprise the PAA; 2) phase-shifting the signals sent to or received from elements of the PAA; and/or 3) digitally generating incremental delay among the signals sent to individual antenna elements.

Crosstalk among the beams is reduced by in the following ways. First, the physical design of the panels minimizes the level of Tx fields that are seen by Rx PAAs. Second, reflectors of millimeter-wave radiation may be embedded within the panels 4100, 4200. Thickness of the reflectors is optimized and simulated in order to ensure that the efficiency benefit gained thereby is not cancelled by the signal degradation caused by multipath propagation introduced by said reflectors. And third, attenuators may be embedded within the panels. The attenuators may be implemented as metamaterials or by conventional lossy materials.

Each PAAX may include beamforming-control circuits, transmitter-drive circuits, RF lens and enclosure elements.

Design of the V-Band and E-Band antennas used within the PAAXs is now discussed. In some configurations, there is no need for a Tx/Rx switch because Tx and Rx antenna elements are implemented as subarrays within each PAAX. Elimination of Tx/Rx switch results in elimination of losses and parasitics associated with the switch. Consequently, link margin is improved.

Each PAAX may be an adaptive array system, which uses adaptive nulling, beam forming, and beam steering. Because antenna elements as well as transceiver elements are embedded within each PAAX, there may be no need for a power combiner or transmission line in the Tx antenna array. Economic costs and performance degradation associated with the power combiner and said transmission line can thus be avoided. Each antenna may be a dedicated integral phased array antenna as defined by European Telecommunications Standards Institute (ETSI). It features dynamic auto-alignment and installation alignment. The antenna is not required to be a stand-alone antenna or a selectable beam antenna. However, some configurations of the system 400 can be built using selectable beam antennas or stand-alone antennas.

In other configurations, each panel 4100, 4200 may have a greater or fewer number of PAAXs and each panel 4100, 4200 may have a different number of PAAXs than the other panel.

Figure 4:
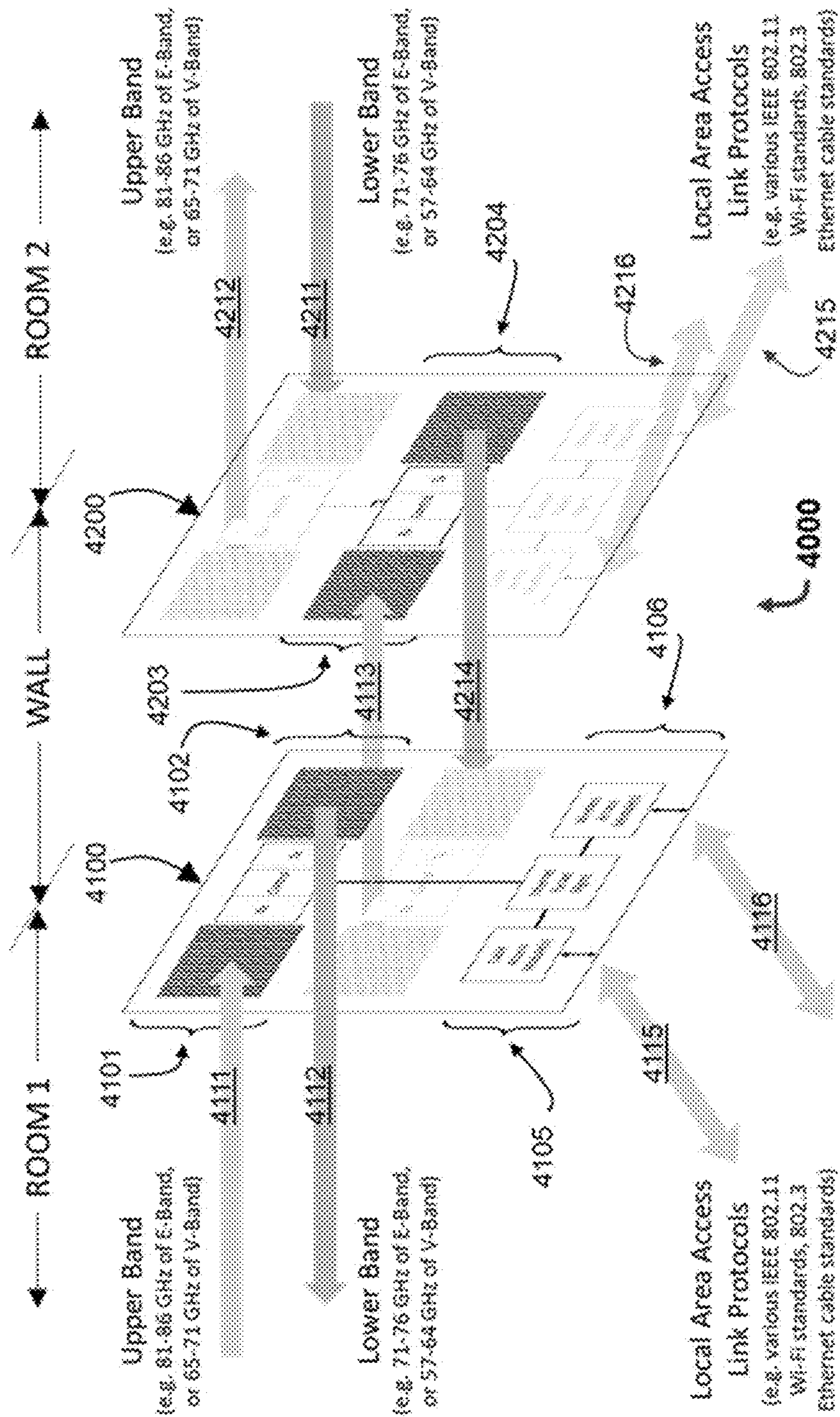
FIG. 4 is a third schematic perspective view of the first exemplary wireless communication system of FIG. 1.
Figure 5:
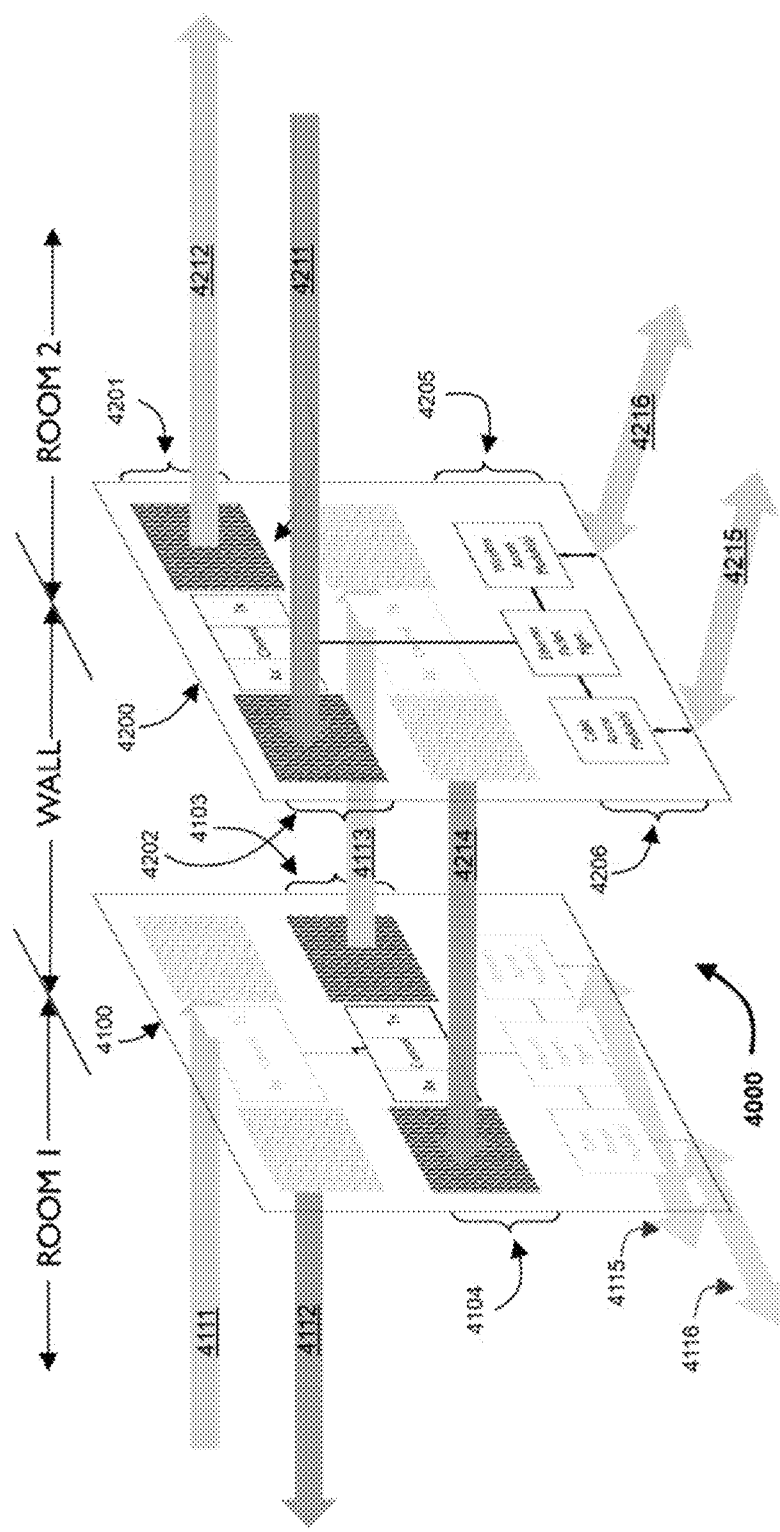
FIG. 5 is a fourth schematic perspective view of the first exemplary wireless communication system of FIG. 1.

FIGS. 4 and 5 are additional schematic perspective views, respectively, of the exemplary wireless communication system 4000. These views show further details of the wireless beam data flows and structure of the system 4000. Table 1 summarizes the panels and their transmit (Tx) and receive (Rx) components by the element numbers shown in FIGS. 4 and 5, along with the element numbers of the corresponding millimeter wave beams.

TABLE 1

Rx and Tx components of panel.

| Panel | Ref number | Frequency <GHz> | Function | Direction | Beam number | PAAX number |
|---|---|---|---|---|---|---|
| 4100 | 4101 | 65-71 | RX | Room 1 | 4111 | 4140 |
| 4100 | 4102 | 57-64 | TX | Room 1 | 4112 | 4140 |
| 4100 | 4103 | 65-71 | TX | Wall | 4113 | 4150 |
| 4100 | 4104 | 57-64 | RX | Wall | 4214 | 4150 |
| 4100 | 4105 | Local wired | TX/RX | Room 1 | 4115 | 4160 |
| 4100 | 4106 | Local wireless | TX/RX | Room 1 | 4116 | 4160 |
| 4200 | 4201 | 57-64 | RX | Room2 | 4211 | 4240 |
| 4200 | 4202 | 65-71 | TX | Room2 | 4212 | 4240 |
| 4200 | 4203 | 65-71 | RX | Wall | 4113 | 4250 |
| 4200 | 4204 | 57-64 | TX | Wall | 4214 | 4250 |
| 4200 | 4205 | Local wireless | TX/RX | Room2 | 4215 | 4260 |
| 4200 | 4206 | Local wired | TX/RX | Room2 | 4216 | 4260 |

In the example system 4000 shown in FIGS. 3, 4 and 5, there are three wireless links, each having a pair of beams. As shown in FIG. 4, in the first link wireless beams 4111 and 4112 carry traffic, including data and control information, that is flowing between the system 4000 and other wireless communication system(s) located within room 1. In this example, the traffic is transmitted and received at V-Band frequencies, for example, those shown in Table 1. Also at V-Band frequencies, beams 4113 and 4214 of the second link carry information which flows through the wall between the panels 4100 and 4200 located in room 1 and room 2. Beams 4212 and 4211 of the third link carry traffic which is flowing between the system 4000 and other system(s) in room 2. The traffic carried by the first, second and third wireless links may be transmitted and received at V-Band frequencies, as shown in Table 1. In this example, signals 4115 and 4116 of the fourth link carry traffic at local wired or wireless band frequencies flowing between PAAX 4160 of the first panel 4100 and terminal access points within room 1. Also in this example, signals 4215 and 4216 of the sixth link carry traffic at local wired or wireless band frequencies flowing between PAAX 4260 and terminal access points within room 2. As described above in connection with FIG. 1, the local access communication paths 4115, 4116, 4215, 4216 may each be any suitable frequency band or protocol, for example, the local wireless 4116, 4215 may each be IEEE 802.11 Wi-Fi signals (any suitable version of Wi-Fi), Bluetooth, or the like; and the local wired paths 4115, 4216 may each be IEEE 802.3 Ethernet signals or the like. Alternatively, the local communication paths may comply with any suitable FCC and International agency wireless and cable standards.

Each of the panels 4100, 4200 includes a plurality of millimeter-wave receivers (Rx's) and a plurality of millimeter-wave transmitters (Tx's). The phased-array antennas of each panel 4100, 4200 may be permanently electrically connected to either Rx or Tx RF front end circuitry, respectively. Correspondence between RF circuits 4101-4106 and 4201-4206 and area of the panels is shown in FIGS. 3, 4 and 5 and given in Table 1.

Each of the Rx circuits 4101, 4104, 4106, 4203, 4202, 4205 generates a respective digital bit stream that corresponds to the waveform of the millimeter-wave signal (beams) incident on the corresponding antenna array. Error correction may be performed on each of the bit streams within the transceiver associated with the PAAX that contains the Rx circuit.

The data flow through the wall uses the second wireless links represented as beams 4113 and 4214. In order to reduce attenuation and other forms of signal degradation, the beams 4113, 4214 are generally normal to the surface of the wall. PAA elements of each PAAX 4150, 4250 of the panels 4100, 4200 are aligned to ensure that each Rx PAA captures the greatest possible proportion of the energy emitted by corresponding Tx PAA of the opposing panel. The proportion of energy received may depend on the exact shape of beams generated by the Rx and Tx PAAs on the panels 4100, 4200. Link margin can be adjusted by modifying the antenna gain, power and noise figure of the Rx PAA and corresponding Tx PAA. For example, antenna gain can be increased by using a larger number of elements within either or both corresponding PAAs of a given beam path. Data passing through the wall may transmitted wirelessly using V-Band, or in other configurations, E-Band.

The system 4000 contains digital circuitry for management of dataflow between bitstreams of the various Rx circuits and digital inputs of the Tx circuits. The digital circuitry also provides leaf-level management of beamforming activity and system power. The digital circuitry may include one or more controllers in each panel 4100, 4200, such as the control described in connection with FIG. 1.

The disclosed wireless systems, including the systems 100, 4000, provide certain advantages. For example, an advantage provided by the system 4000 is the elimination of wires and cables that legacy networks use to carry communication signals because the system 4000 allows millimeter wireless communication links to pass through walls. Using the system 4000 allows millimeter-wave wireless links to replace the wires and cables. This greatly reduced installation costs to deploy the latest, high-speed digital communication technology in commercial environments. Beamformers may establish connections between nodes in a network, instead of wires or cables. Phase-array antennas with embedded transceiver electronics, such as the PAAX disclosed herein, improve the security, economy and performance of the beamformers.

A second advantage delivered by the disclosed systems is to greatly improve the data rates available in legacy wireless networks. A third advantage delivered by the disclosed systems is a reduction in eavesdropping and security, since the wireless signals can be narrow beams. A fourth advantage delivered by the disclosed systems is fast and scalable communication path tracking that may improve network speed. A sixth advantage delivered by the disclosed systems is to greatly improve penetration through walls, and when combined with other similar systems into a network, to penetrate through multiple walls and barriers commonly encountered within business enterprise environments such as buildings. The walls and obstructions might otherwise collectively increase the path loss of a signal to a point of signal failure. The disclosed systems also facilitate implementation of software-defined networks and self-organizing networks.

Figure 6:
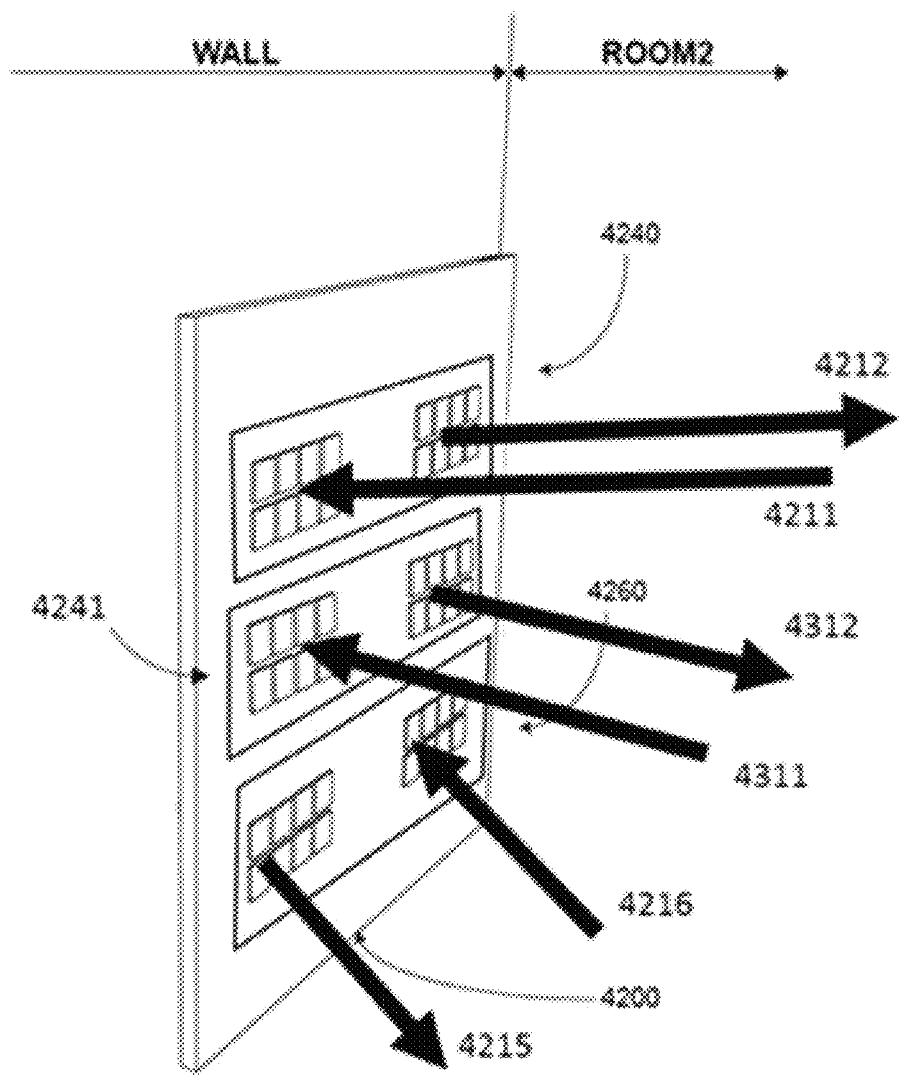
FIG. 6 is a schematic perspective view of a second exemplary wireless communication system includable in the wireless networks disclosed herein.

FIG. 6 is a schematic perspective view of a fourth exemplary wireless communication system 4400. Referring to FIG. 6, panel 4400 may be used independently as a single panel to "reflect" or divert traffic back into the room in which the received signal originated. This function is especially useful when significant beam angles are required, such as steering a beam around a corner. In this example, the panel receives (and/or transmits) signals from one side of the room (beams 4212 and 4211), then transceives the same signals through beams (4311 and 4312) another direction or angle in the same room, thus avoiding obstacles that might otherwise be difficult to reach through line of sight. In this way, the room-facing PAAXs 4240, 4241 act as a reflector. The signals may be conditioned (e.g., amplified, down-converted, demodulated, then re-modulated, up-converted and/or amplified) prior to retransmission as describe earlier herein.

Similar in function as PAAX module 4240, PAAX 4241 may receive the V-Band traffic directly from PAAX 4240 through one or more internal busses, but rather than carry the traffic of beams 4212 and 4211 wirelessly through the wall side (opposite side) of the panel 4400, PAAX 4241 returns the wireless traffic through beams 4311 and 4312, respectively, and links to another wireless system within Room 2, instead of through the wall. Beams 4312 and 4311 may carry the same V-Band traffic as 4211 and 4212.

The other disclosed wireless system, e.g., system 100, may be alternatively configured in like manner with the spine wireless links all facing away from the same side of the panel so that wireless traffic is reflected or diverted back into the room in which the received signal originated.

Other wireless systems may be used in the networks described herein, such as wireless communication system 7000 disclosed in the related U.S. patent application Ser. No. 15/906,161, entitled "Millimeter Wave Communications Through Obstructions," filed Feb. 27, 2018, which is incorporated by reference herein in its entirety.

Figure 7:
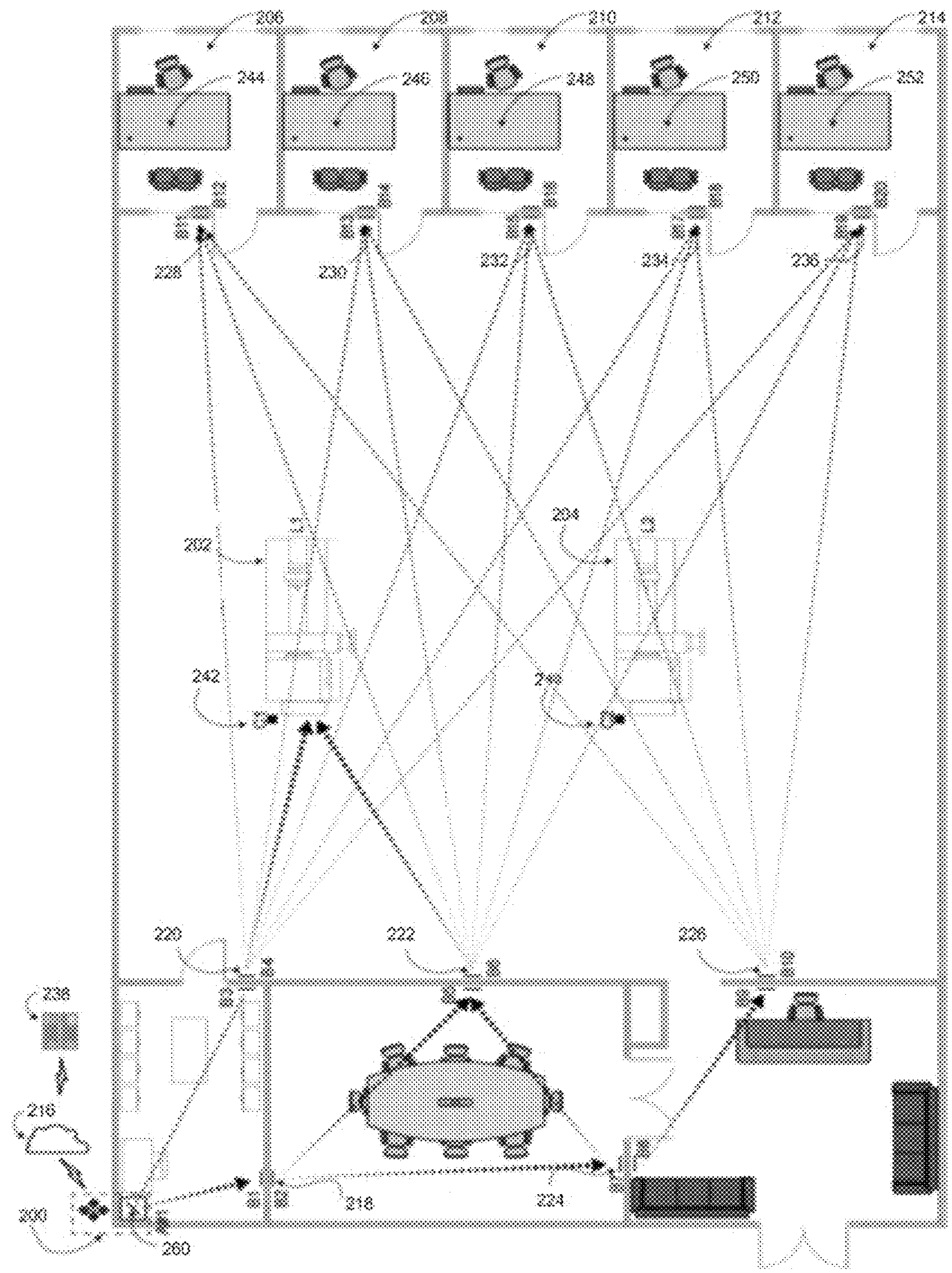
FIG. 7 is a contextual schematic illustration of a third exemplary wireless communication network in an enterprise environment.

FIG. 7 is a schematic top plan view of another exemplary wireless communication network in an enterprise environment, for example, a light-manufacturing enterprise. The enterprise may use high-speed wireless data for a variety of machinery (shown as machine 202 and machine 204), and personal work areas 206-214 distributed throughout the enterprise, at data rates of up to 20 Gbps or more. In some networks, it is desirable that the high-speed, wireless data be provided securely to the machines and workstations as well, to prevent eavesdropping. An enterprise gateway 200 may provide secure, high-speed wireless communications to the machines and the work areas. Enterprise gateway 200 may include a high-speed modem, switch, router or the like, capable of very high data rates (20 Gbps or more), coupled to a wide-area network 216, such as the Internet, a datacenter, another gateway located in another building, and/or one or more wired or wireless legacy local-area networks.

The enterprise gateway 200 may further include a means for wirelessly communicating data traffic into the enterprise, for example, a wireless transceiver and one or more antennas, such as a directional phased array antenna transceiver (PAAX) 260. The PAAX 260 may include integral support electronics, such as power amplifiers, millimeter-wave transceivers, beamformers, controllers, filters, modems, and memory elements. The PAAX 260 may also include one or more RF lens elements which improve antenna efficiency and directionality. The PAAX 260 generally communicates line-of-sight or by wire with one or more wireless systems, e.g., any of the disclosed wireless communication systems 100, 4000, 4400, 5000, 7000, within the same room as the gateway 200, such as wireless systems 218, 220 in FIG. 7, forming a high speed data "trunk" or link. As shown, the gateway communication with panel B1 of the system 218 and panel B3 of system 220. The wireless systems can form beams of millimeter-wave radiation and direct the beams over a range of angles. The range of angles may be between +/−50 degrees (horizontal) and +/−30 degrees (vertical). The width of any of the beams may be one degree or more. The directions of emission of the beams is controlled by electrical control signals within the PAAX 260 that configure the phased array antenna(s).

Each of wireless systems 218, 220 begins a process of reception in one room, retransmission through a wall, and retransmission to other wireless communication systems in adjacent rooms. This process can be replicated, allowing high data rate signals from enterprise gateway 200 to propagate through multiple walls without degradation to multiple receivers or transceivers located throughout a large area, such as a manufacturing facility, office building, warehouse, retail store, apartment building, mall, arena, or the like.

A routing table is used by enterprise gateway 200 and/or a server 238 coupled to enterprise gateway 200 in order to efficiently route communications between enterprise gateway 200 and one or more intended recipients, such as machines 202, 204 (associated with wireless systems 240, 242, respectively) and end-user terminals 244-252 (associated with wireless systems 228-236, respectively). Communications may be routed depending on a number of factors, such as present capacity on the various wireless communication systems based on a quantity of data being processed by any of the wireless communication systems at any given time. The routing table may include a variety of information, such as a list of available wireless communication systems in the system and beam angles, distances between wireless communication systems, power levels needed to achieve various bandwidths, bandwidth capabilities of each wireless communication system, security settings, node identity info, and/or other information.

The enterprise gateway 200 may be programmed to deliver near real-time reconfiguration of the network, links, services, and capacity and may reduce capital expenditure through a closed loop automation approach that provides dynamic capacity and consistent failure management when and where it is needed.

The enterprise gateway 200 and/or a server 238 coupled to enterprise gateway 200 routes data through the enterprise network by forming data packets. Each data packet comprises a payload section and one or more sections denoting a routing path and/or addresses as determined by the routing table. In the case of data being delivered to end devices such as 202-204 or 244-252, data is received from one or more external sources, such as web servers, personal computers, a cloud, the Internet, or the like and provided to enterprise gateway 200 and/or server 238. Often, the data is in the form of TCP/IP packets. The gateway 200/server 238 may format the data to suit a particular end device, such as a particular type of machine or computing device that receives data from a wireless communication system. In any case, the data received by the gateway 200/server 238 may be packetized into a format for transmission across the enterprise network. This may include encapsulating the data into packets having a source address, destination address, and one or more addresses that denote which wireless communication system to transmit to next. The routing table discussed earlier is used to instruct each wireless communication system in the transmission path determined by the routing table where to point its wireless beams, i.e., toward another wireless communication system located on an opposing wall or in some configurations, to a work station or machine or other end point.

Once a packet is complete, it may be scheduled for transmission by gateway 200/server 238 along with other packets waiting for transmission. Gateway 200 is typically able to transmit multiple data streams simultaneously to multiple recipients.

In one configuration, scheduling the packets includes combining or interleaving the packets with other network traffic. For example, "fill packets" may be generated by gateway 200/server 238 during low-traffic conditions in order to confuse potential eavesdroppers.

Still referring to FIG. 7, communication paths may be determined by server 238, gateway 200, one or more wireless communication systems 218-226, 240-242, 228-236, and/or one or more end-user terminals. In some configurations, a "Self-Organizing Network" protocol (SON) is used by one or more of the server 238, gateway 200 and/or one or more wireless communication systems 218-226, 240-242, 228-236 to determine things such as bandwidth usage by each wireless communication system, signal quality, or the like. Using this information, the server, gateway and/or one or more wireless communication systems may re-provision one or more wireless communication systems and perform load-balancing calculations in order to maximize the efficiency of the network. For example, in some exemplary networks, a SON protocol based on an open-source platform, such as AT&T ECOMP (Enhanced Control, Orchestration, Management & Policy) platform may be used. The ECOMP software platform delivers product/service independent capabilities for the design, creation and lifecycle management for carrier-scale, real-time workloads. It consists of eight software subsystems covering two major architectural frameworks: a design time environment to design, define and program the platform, and an execution time environment to execute the logic programmed in the design phase utilizing closed-loop, policy-driven automation.

In some configurations, an end-to-end path is chosen by an "originating device," such as server 238 or gateway 200, using the SON protocol, based on information in the routing table. The originating device then provides instructions to each of the room-facing wireless communication systems in the chosen path of where to point their wireless antennas in order to communicate with either another room-facing wireless communication system or an end user device. Each room-facing wireless communication system provides information to the routing table indicative of other wireless communication systems through which communications are possible. The information may include phase information that defines a physical angle from the panel face of a room-facing wireless communication system at which communications with another room-facing wireless communication system is possible. Other information may include acquisition and signal routing protocols. This information may be obtained during an initialization process once a number of wireless communication system pairs are installed in a building. In other words, from the SON instructions, wireless communication systems will connect to other wireless communication systems, creating a programmable set of wireless links resulting in a communication path to an end device. Other features such as upstream and downstream bandwidth allocation, security, or the like may also be determined by an originating device.

In some configurations, the wireless communication systems may aid in determining a communication path between an originating device and one or more end terminals, based on current communication conditions. For example, a stream of data may be sent from the gateway 200 to the wireless communication system 218, the stream containing identifying information of an end device to which the data stream is intended. The PAAX of panel B1 of wireless communication system 218 receives the stream, and transmits it through the wall to PAAX B2 of system 218. Wireless communication system 218 may include a routing table stored in memory, obtained using the SON protocol, that lists other room-facing wireless communication systems, e.g., systems 222, 224, able to communicate with wireless communication system 218 and phase information defining a beam angle for each of the other room-facing wireless communication systems. Each of the other room-facing wireless communication systems listed in the routing table typically includes information pertaining to other room-facing wireless communication systems through which they may communicate. In other words, each room-facing wireless communication system in a system may include a routing table that allows each wireless communication system to determine one or more paths to reach an adjacent intended recipient in the wireless network.

For example, in FIG. 7, if a data stream is intended for wireless system 242, wireless communication system 218 may communicate with room-facing wireless communication system 222 or 224. Wireless communication system 218 knows that the data stream can reach transceiver 242 via multiple wireless communication system routes because its routing table lists wireless communication system 222 as a potential communication device, and wireless communication system 222 also lists the ability to communicate with transceiver 242. Similarly, the routing table stored in wireless communication system 222 lists wireless communication system 224 as a potential communication device, one that also lists the capability of communicating with wireless communication system 226, which in turn lists transceiver 242 as an available device for communication. Thus, each wireless communication system in the network may store a routing table that lists other wireless communication systems or end devices through which communications are possible.

Each wireless communication system 218-226, 240-242, 228-236 in the network may be able to re-transmit signals received in a room to another wireless communication system in the same room.

Figure 8:
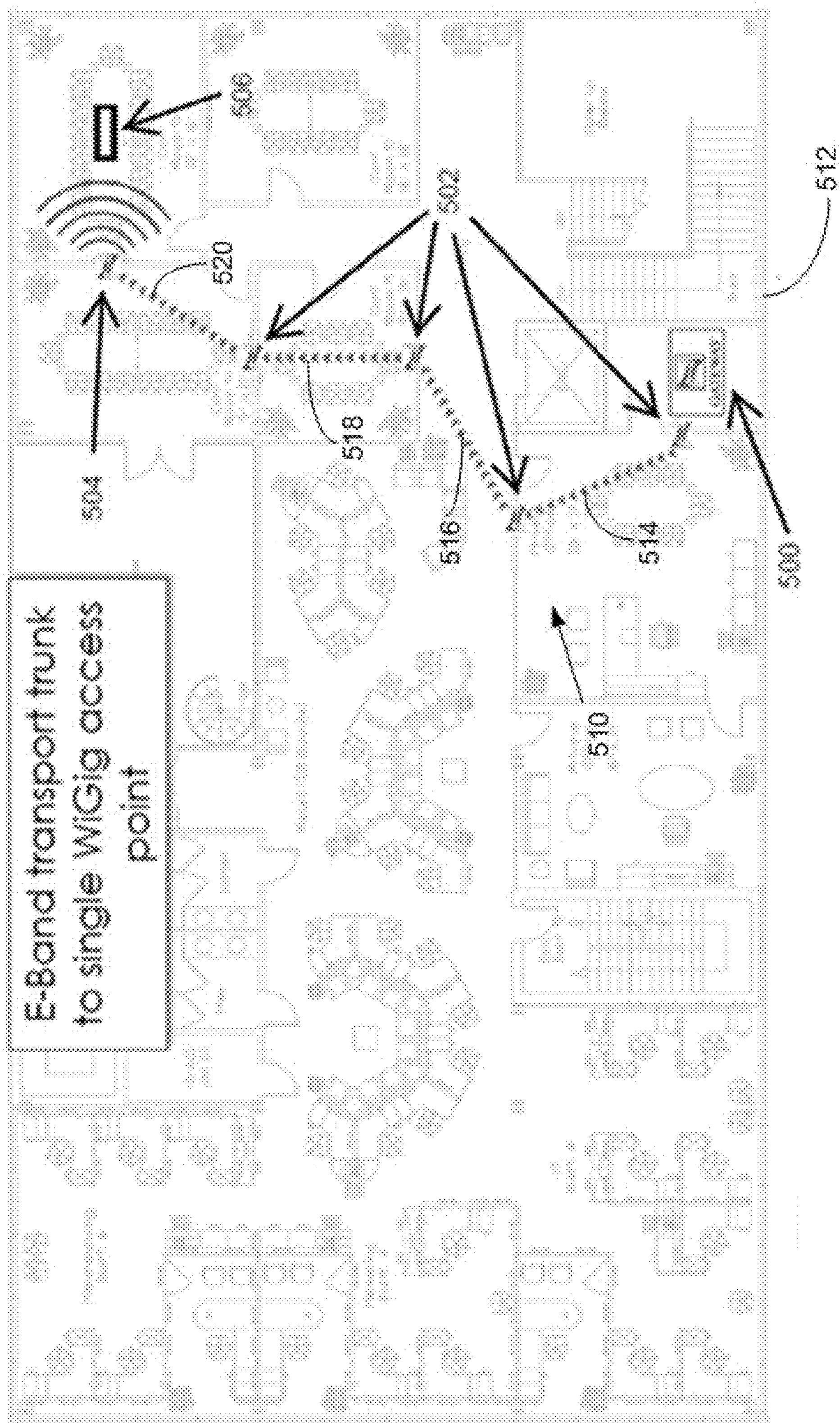
FIG. 8 is a contextual schematic illustration of a fourth exemplary wireless communication network in an enterprise environment.

FIG. 8 is a schematic top plan view of another exemplary wireless communication network 510 in an enterprise environment, for example, an office building 512 where an enterprise gateway 500 communicates with one or more end devices 506 via five wireless communication systems 502, 504. In this exemplary network 510, the first four wireless communication systems 502 provide a high speed, bidirectional data path, "spine," or "trunk line" consisting of wireless links 514-520, for example at E-Band or V-Band of up to 40 Gbps and beyond at certain distances, through walls and across open floor space, to the last wireless communication system 504, which may communicate with the end device 506 via one or more standards-based communication signals, such as Wi-Fi, e.g., IEEE 802.11ac or 802.11n, WiGig (offering speeds of up to 20 Gbps or more) or a wired connection such as Ethernet. Wireless communication system 504 may act as a standards-based access point for end devices.

The gateway 500 may be the same as or similar to the gateway 200 described in connection with FIG. 7. Each of the wireless communication systems 502, 504 may be any of the disclosed wireless communication systems, e.g., systems 100, 4000, 4400, 5000, 7000. The end-user terminal devices 506 may be any network enabled device, such as a computer, laptop, game console, smartphone, cable box, robotics equipment, high resolution monitors, virtual reality equipment, manufacturing equipment, or the like. End user terminal devices 506 may also be intermediary connector, hub, or plug-in components specifically linked through wireless connections to wireless communication systems 502, 504. In this manner, the connectors, hub, or plug-in components are inserted or connected to other end-user terminal interface ports (located within computers, monitors, video equipment, or the like), such as Ethernet RJ-45 ports, or USB ports. In this manner, 506 thereby acts to terminate the wireless link from systems 502 or 504, then repeat or transfer the communications streams into other end-user terminals by way of the interface ports.

Figure 9:
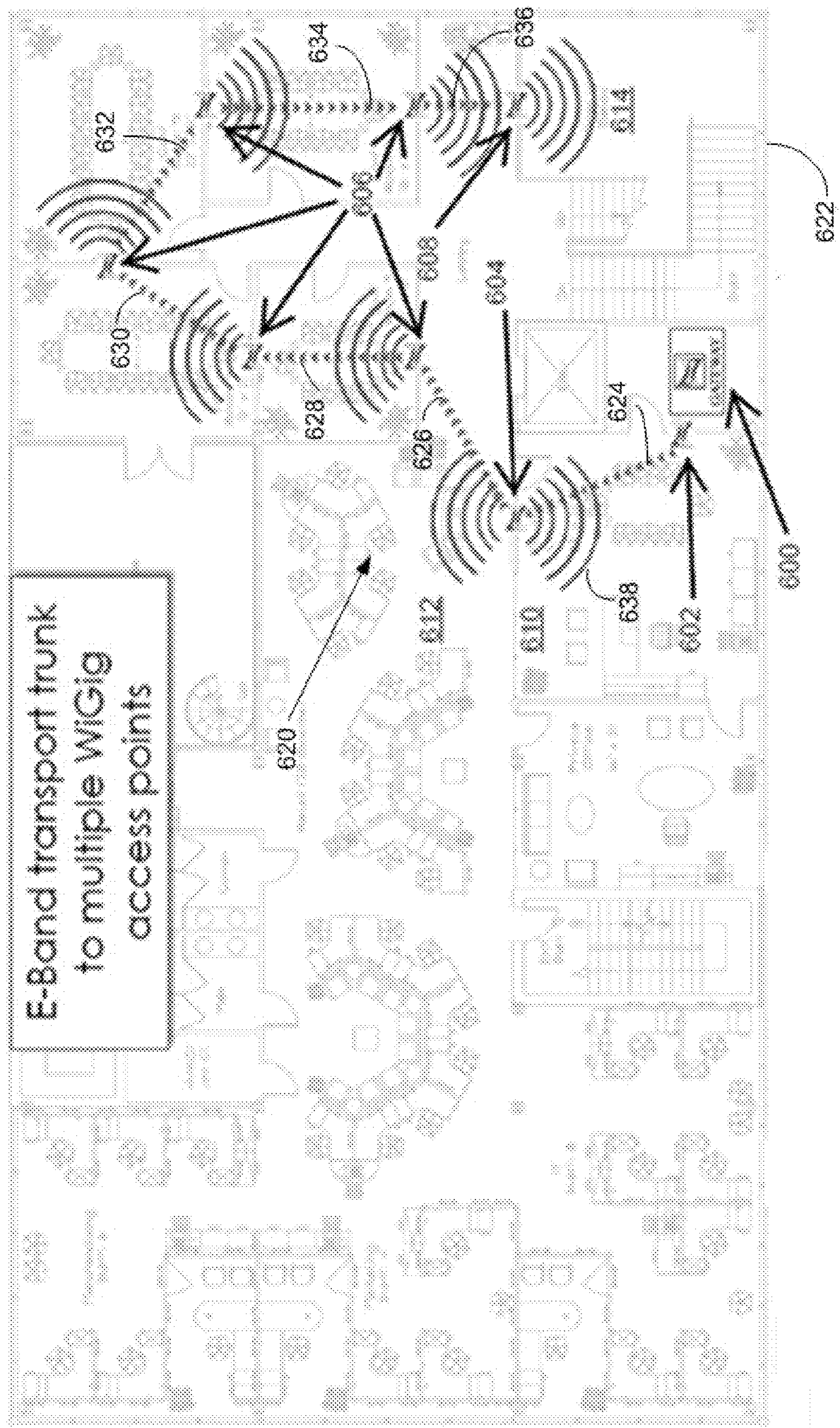
FIG. 9 is a contextual schematic illustration of a fifth exemplary wireless communication network in an enterprise environment.

FIG. 9 is a schematic top plan view of a further exemplary wireless communication network 620 in an enterprise environment, for example, an office building 622. FIG. 9 is similar to FIG. 8, except that the wireless communication systems 602, 604, 606, 608 are programmed into multiple access points. Communications to and from the building 622 are routed through gateway 600 (which may be the same or similar to gateway 200 described in connection with FIG. 7). The wireless communication system 602 operates as a trunk node to provide high speed wireless communications directly to/from wireless communication system 604. Wireless communication system 604 operates both as a trunk node, offering high speed communications directly through a sequential series of wireless communication systems 606, while also providing as a standards-based access to end devices located in rooms 610 and 612. The wireless systems 602, 604, 606, 608 create a high speed wireless spine consisting of wireless links 624, 626, 628, 630, 632, 634, 636, which may be E-Band and/or V-Band links. The intermediate wireless communication systems 604, 606 are each configured to provide high speed, trunked communications or wireless links through a series of rooms while simultaneously acting as a standards-based access point for end devices within the respective rooms. Finally, wireless communication system 608 acts as a standards-based access point for end devices located in room 614, but does not forward the trunk wireless signal to other downstream wireless communication systems.

The wireless communication systems 604, 606, 608 may communicate with the end devices via one or more standards-based communication signals, such as Wi-Fi, e.g., IEEE 802.11ac or 802.11n, WiGig (offering speeds of up to 20 Gbps or more) or a wired connection such as Ethernet. Wireless communication systems may each act as a standards-based access point for end devices. The wireless communication systems 602, 604, 606, 608 may communicate with each other using E-Band or V-Band beams. Each of the wireless communication systems 602-608 may be any of the disclosed wireless communication systems, e.g., systems 100, 4000, 4400, 5000, 7000. The end devices may be any network enabled device, such as a computer, laptop, game console, smartphone, cable box, intermediary connector, hub, or plug-in component, or the like.

Figure 10:
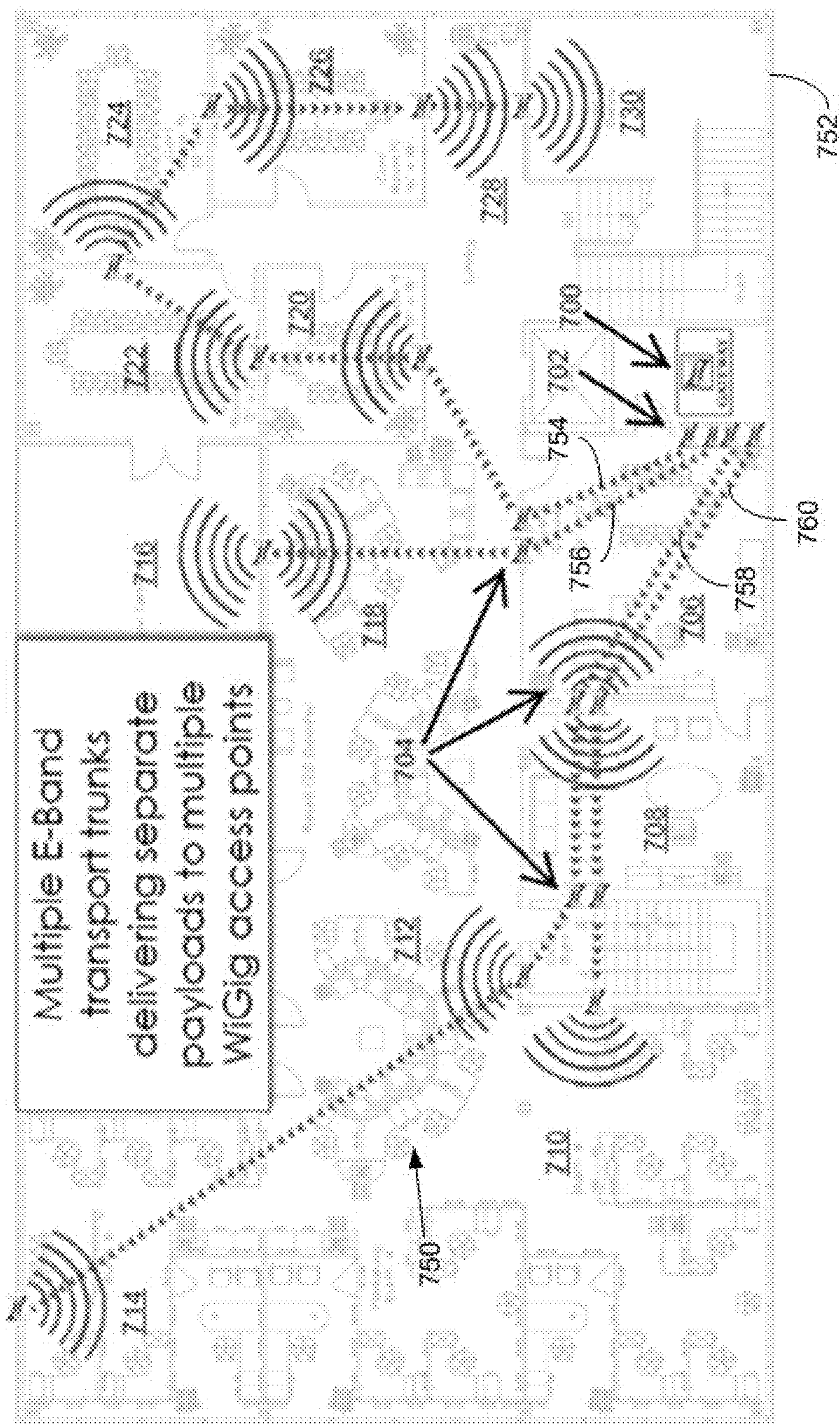
FIG. 10 is a contextual schematic illustration of a sixth exemplary wireless communication network in an enterprise environment.

FIG. 10 is a schematic top plan view of another exemplary wireless communication network 750 in an enterprise environment, for example, an office building 752. FIG. 10 is similar to FIG. 9, except that in this example, multiple high speed transport trunk lines or spines, such as E-Band and/or V-Band transport trunks, are used to deliver separate payloads to/from gateway 700 to/from multiple end devices.

In this example network 750, high speed, four wireless trunked communication lines or spines are provided throughout the building via multiple wireless communication systems, such as wireless communication systems 702 and 704, as well as the other wireless communication systems, as shown by the wireless links 754, 756, 758, 760. In this example, four high speed, wireless trunk lines are provided, connecting gateway 700 with areas 706, 708, and 710 in one trunk line 760, areas 706, 708, 712, and 714 on a second trunk line 758, areas 716 and 718 in a third trunk line 756, and areas 720-730 in a fourth trunk line 754. As before, some wireless communication systems are configured to only route high-speed trunked communications (e.g., E-Band or V-Band), some are configured to act as standards-based access points, while others are configured to offer both types of communications.

The wireless communication systems included in the network 750 shown in FIG. 10 may communicate with the end devices via one or more standards-based communication signals, such as Wi-Fi, e.g., IEEE 802.11ac or 802.11n, WiGig (offering speeds of up to 20 Gbps or more) or a wired connection such as Ethernet. The wireless communication systems may each act as a standards-based access point for end devices. The wireless communication systems of the network 750 may communicate with each other using E-Band or V-Band beams. Each of the wireless communication systems of FIG. 10 may be any of the disclosed wireless communication systems, e.g., systems 100, 4000, 4400, 5000, 7000. The end devices may be any network enabled device, such as a computer, laptop, game console, smartphone, cable box, or the like.

Figure 11:
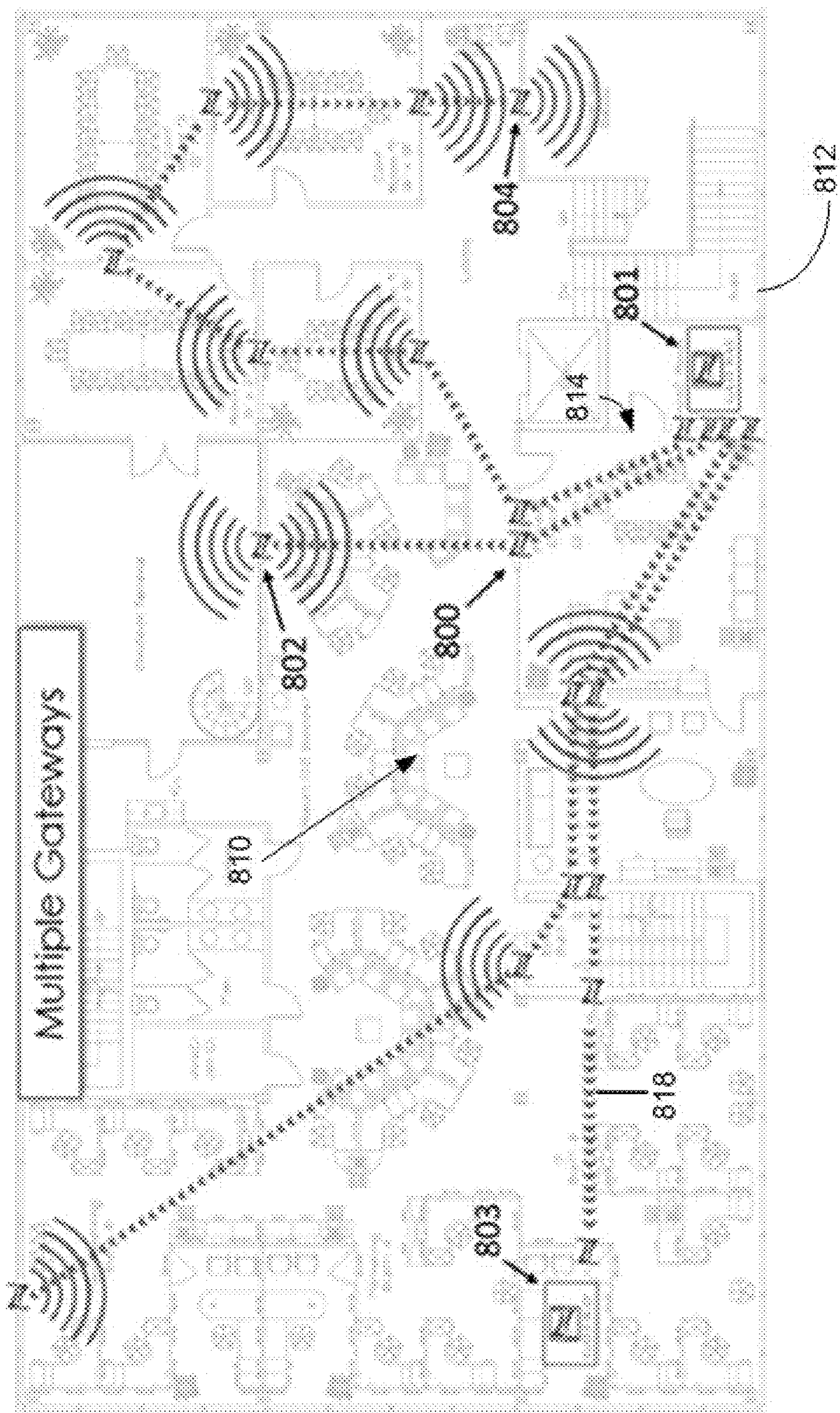
FIG. 11 is a contextual schematic illustration of a seventh exemplary wireless communication network in an enterprise environment.

FIG. 11 is a schematic top plan view of a further exemplary wireless communication network 810 in an enterprise environment, for example, an office building 812. FIG. 11 is similar to FIG. 10; however, in this network, multiple enterprise gateways 801 and 803 are used to send and receive data to remote, external destinations, as well as to provide communications with a plurality of end devices located within the building 812. End devices in building room may receive signals from one or more of the gateways 801, 803, depending on criteria such as their location in the building, system load conditions, outages, or the like. A trunk line (e.g., wireless paths 814, 818) may be established from any of the gateways through one or more wireless communication systems. Some wireless communication systems may be configured solely to continue the trunk, as shown by wireless communication system 800. Other wireless communication systems, for example wireless communication systems 804, provide standards-based wireless communications with end devices, but do not provide a high speed trunk line to any other wireless communication system. Finally, other wireless communication systems such as wireless communication systems 802, offer both standards-based wireless communications to end devices as well as trunked communications to other wireless communication systems.

The gateways 801, 803 may each be the same or similar to gateway 200 described in connection with FIG. 7. The wireless communication systems included in the network 810 may communicate with the end devices via one or more standards-based communication signals, such as Wi-Fi, e.g., IEEE 802.11ac or 802.11n, WiGig (offering speeds of up to 20 Gbps or more) or a wired connection such as Ethernet. The wireless communication systems may each act as a standards-based access point for end devices. The wireless communication systems of the network 810 may communicate with each other using E-Band or V-Band beams. Each of the wireless communication systems of FIG. 11 may be any of the disclosed wireless communication systems, e.g., systems 100, 4000, 4400, 5000, 7000. The end devices may be any network enabled device, such as a computer, laptop, game console, smartphone, cable box, or the like.

Figure 12:
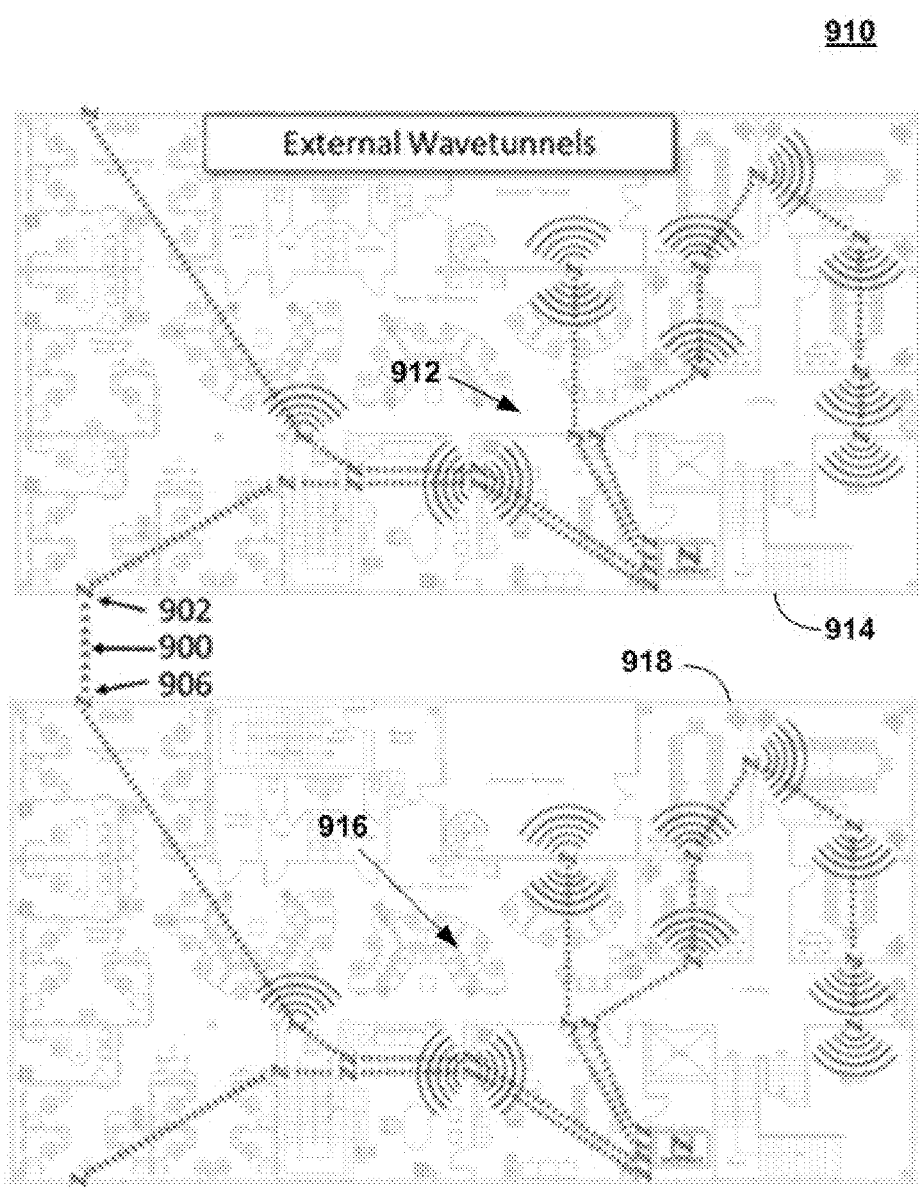
FIG. 12 is a contextual schematic illustration of an eighth exemplary wireless communication network in an enterprise environment.

FIG. 12 is a schematic top plan view of another exemplary wireless communication network (including building networks 912, 916) in an enterprise environment, for example, two buildings 914, 918 having a bi-directional, high speed wireless communication link 900 between them. The E-Band wireless communication system allows high speed communications over relatively long distances, enabling wide area networks and multi-building "campuses" to be connected by wireless communication systems 902, 906 packaged in environmentally hardened enclosures, such as weather-proof boxes. FIG. 12 shows a multi-building campus topology, whereby the wireless link 900 connects two building networks 912, 916 together by wireless communication systems 902 and 906. In this example, wireless communication systems may be used to penetrate exterior walls to connect a wider area build network.

The networks 912, 914 may each include the components the network 750 shown in FIG. 10. Each of the wireless communication systems 902, 906 may be any of the disclosed wireless communication systems, e.g., systems 100, 4000, 4400, 5000, 7000. The wireless link may be a bi-directional link including E-Band or V-Band beams.

Figure 13:
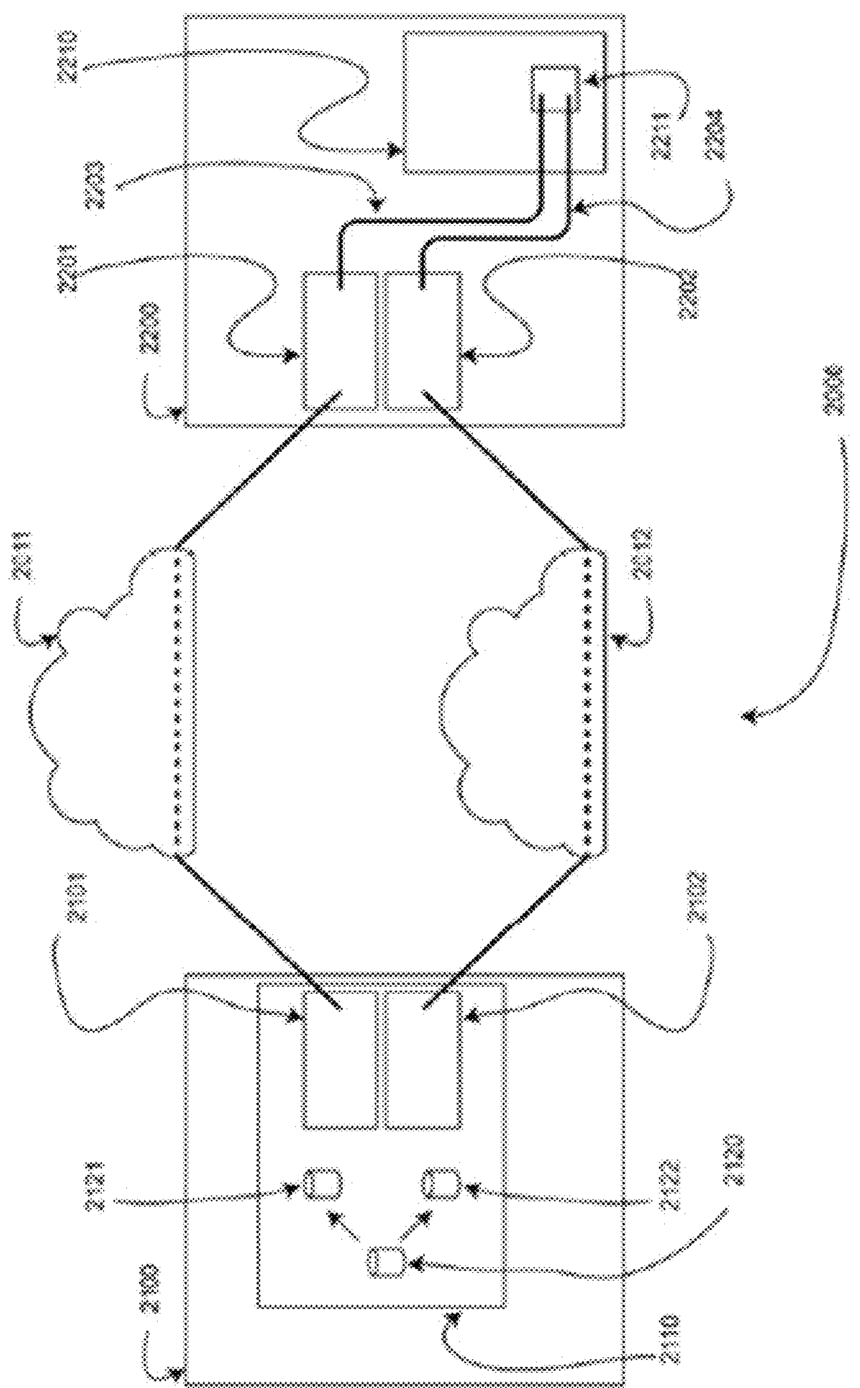
FIG. 13 is a schematic illustration of an exemplary distribution network for high-value content.

FIG. 13 is a schematic illustration of an exemplary distribution network 2000 for high-value content. The network 200 enhances data security so that secrecy cannot be easily compromised by eavesdropping. FIG. 13 shows an exemplary functional block diagram showing a datacenter 2100 used for distribution of high-value content. It is desirable that this content not be vulnerable to eavesdropping. An exemplary high-value content is a digital database 2120 containing one or more feature films, which is about to be released after investment of a hundred million dollars. In this example, the database is being distributed to conference room 2210, located in enterprise 2200. The distribution uses gateways 2101 and 2102 of datacenter 2100 and gateways 2201 and 2202 of enterprise 2200.

The datacenter 2100 contains a vault 2110. The vault 2110 is secure against theft and eavesdropping. The database 2120 includes information that is to be served securely to conference room 2210. In this example, within vault 2110, database 2120 is used to generate two files 2121 and 2122 of content or data. The two files are encrypted using a robust algorithm such as Diffie-Hellman two-key authentication. The encryption is defined by the fact that it is computationally infeasible to produce any readable portion of the source database 2120 without possessing both encrypted files. A computer or server (not shown) in the vault 2110 may be used to encrypt the files 2121, 2122 using commercially-available encryption applications.

Encrypted files 2121 and 2122 are sent via gateways 2101 and 2102, respectively. The files travel over two communication networks 2011 and 2012 and are received via gateways 2201 and 2202, respectively, of enterprise 2200. The files travel on communication paths 2203 and 2204 within enterprise 2200. Each of the paths 2203, 2204 may be a series of wireless links. For example, the wireless links may be implemented using any of the wireless communication systems or networks disclosed herein. Paths 2203 and 2204 may be orthogonal in the sense that they share no common links. The encrypted files are received by an end device 2211, within conference room 2210. Any eavesdropper who intercepted any portion of either file 2121 or 2122 would be unable to decrypt any portion of source database 2120. Only when both of the encrypted files have been assembled in a single end device does it become possible to decrypt. Although the above example deals only with one-way transmission of data, this method allows encryption of two-way communication channels. The end device may be any of the end devices disclosed herein, configured to decrypt the files using, for example, a commercially-available encryption application.

The foregoing encryption and security scheme may also be deployed within a single indoor building or multi-building campus environment.

Figure 14:
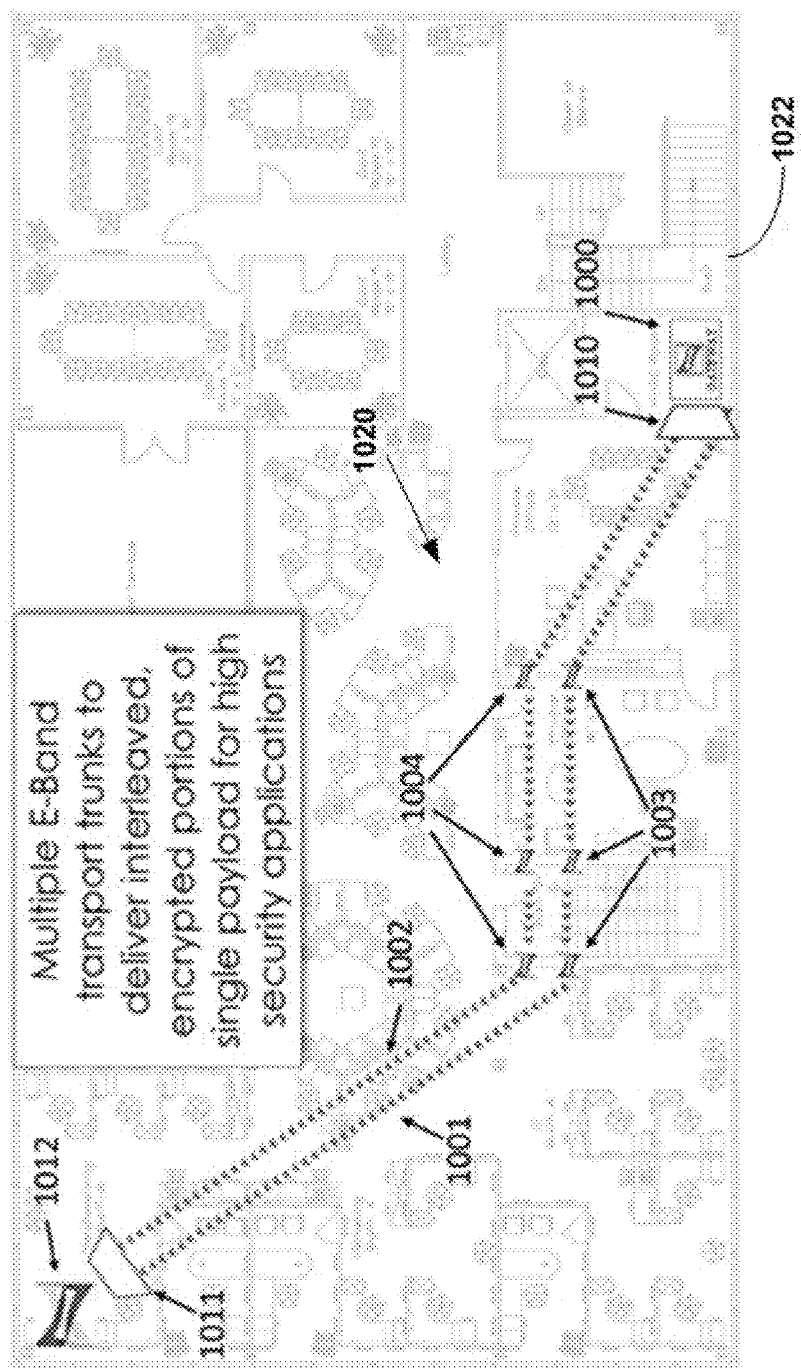
FIG. 14 is a contextual schematic illustration of a ninth exemplary wireless communication network in an enterprise environment.

FIG. 14 is a schematic a top plan view of another exemplary wireless communication network 1120 in an enterprise environment, such as a building 1022. The network 1020 includes two bi-directional, high speed wireless communication links 1001 and 1002 connecting a gateway 1000 to an end user destination 1012. The network 1120 may be used to implement the secured wireless network having paths 2203, 2204 in the enterprise 220 shown in FIG. 13. Similar to the description of FIG. 13 above, data files from gateway 1000 are separated, encrypted (for example, by an application running on the gateway 1000) and sent via functions within 1010. The encrypted files travel on wireless paths 1001 and 1002, respectively, and are received via gateways within gateway 1011. Each of the paths flows through a series of wireless communication system links 1003 and 1004, respectively. The wireless paths 1001 and 1002 are orthogonal in the sense that they share no common links. The files are received by two separate wireless communication systems within the combining and decrypting functions of gateway/server 1011, then provided to end-user terminal 1012. Any eavesdropper who intercepted any portion of either file travelling on paths 1001 or 1002 would be unable to successfully decrypt the files. Only when both of the encrypted files have been assembled in a single combiner function within gateway/server 1011 does it become possible to decrypt the content carried by both files. Although the above example deals only with one-way transmission of data, this method allows encryption of two-way communication channels. The wireless systems 1003, 1004, gateway 1000, and end terminal device 1012 may be any of those disclosed herein.

An objective of some of the disclosed networks is attainment of robust reliability which cannot be compromised in critical transmission applications. An additional network is now described that addresses this objective.

Figure 15:
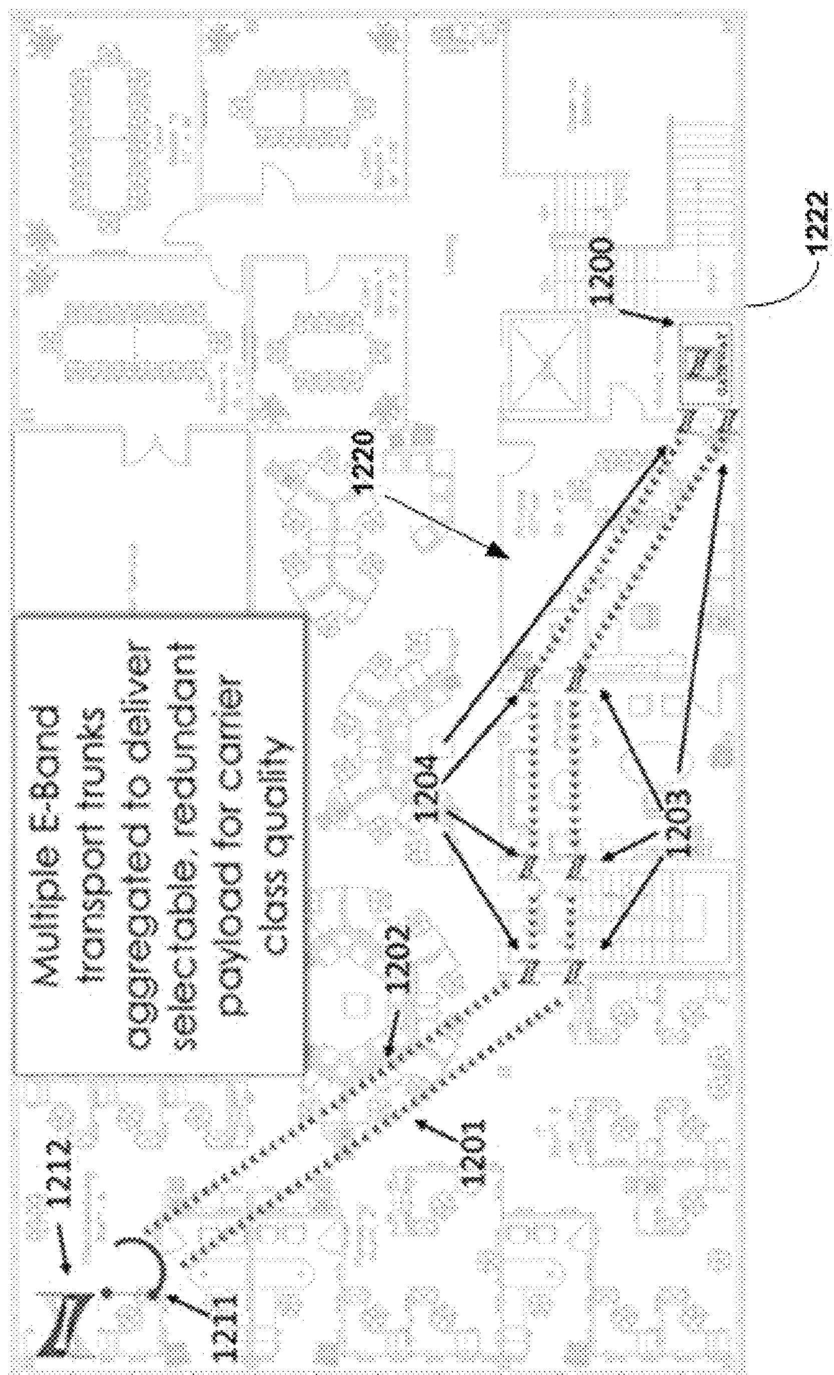
FIG. 15 is a contextual schematic illustration of a tenth exemplary wireless communication network in an enterprise environment.

FIG. 15 is a schematic top plan view of another exemplary wireless communication network 1220 in an enterprise environment, such as a building 1222. The network 1220 includes two bi-directional, high speed wireless communication paths 1201, 1202. This network configuration provides more robust reliability that can support critical data transfer applications. For example, the network 1220 can provide a hot standby capability. Hot standby is a redundant method in which one system runs simultaneously with an identical primary system. Upon failure of the primary system, the hot standby system may immediately take over, replacing the primary system. However, data is still mirrored in real time. Thus, both systems may have identical data. Hot standby also is described as a failover technique to ensure system reliability and security, which is achieved by having a standby device or system ready to take over in the event of device or system failure. Furthermore, a hot standby component is designed to significantly reduce the time required for a failed system to return to normal operations with an objective to ensure a high degree of system availability.

In this example, FIG. 15 shows a primary transmission link 1201 and a hot standby communication link 1202. Both links may carry identical data from gateway 1200, but remain orthogonal through beam diversity with primary path 1201 linked from the gateway 1200 by wireless communication systems 1203, and hot standby path 1202 linked separately to the gateway by wireless communication systems 1204. Selectable switch 1211 links with primary path 1201 during normal operation. In the event of a network failure detection or performance degradation on the primary path 1201, switch 1211 has the capability to rapidly disengage from link 1201, then quickly engage link 1202 to continue communications of redundant, identical data. The switch 1211 may be a commercially-available network switch, for example, one from network companies, such as Cisco Networks or Huawei.

Using any of the disclosed wireless communication systems 100, 4000, 4400, 5000, 7000, any suitable number of redundant wireless links may be economically implemented. Using wireless links has advantage over deploying physical wire or cable, as wiring or cabling redundancy has limited the flexibility and portability in hot standby configurations.

Although shown in relatively close proximity in the FIG. 12, in practice, the separate beam 1201 and 1202 can be configured as geographically diverse as the implementation dictates. The wireless network 1220 may include any of the wireless communication systems, e.g., systems 100, 4000, 4400, 5000, 7000, disclosed herein and any of the other disclosed network components described in connection with the other figures.

Figure 16:
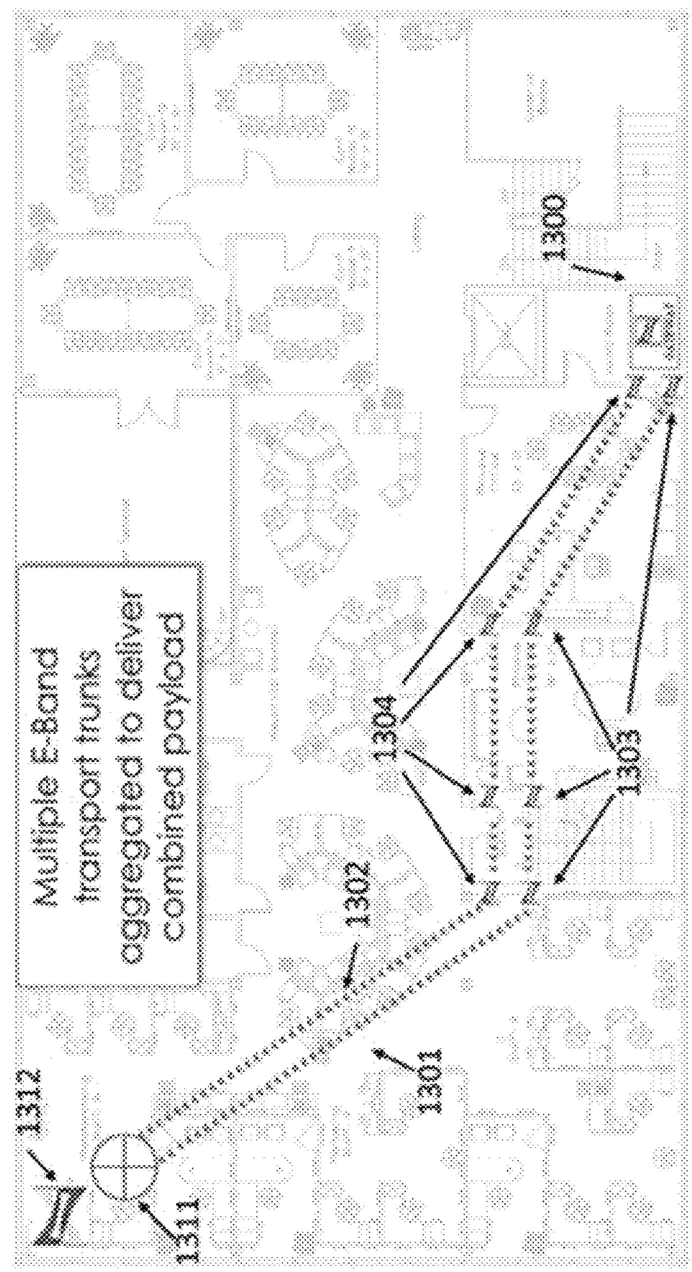
FIG. 16 is a contextual schematic illustration of an eleventh exemplary wireless communication network in an enterprise environment.

FIG. 16 is a schematic top plan view of another exemplary wireless communication network in an enterprise environment, such as a building. The network includes two bi-directional, high speed wireless communication paths or links 1301, 1302. In this example, the two primary transmission links 1301 and 1302 each carry independent and equally prioritized payloads. This multipath configuration may supply increased data rates that satisfy high data bandwidth applications and future applications, as well as provide wireless communication network configurations that expand data rates as needed.

Both links 1301, 1302 carry unique data from gateway 1300 and remain orthogonal through beam diversity, with path 1301 linked from the gateway 1300 by wireless communication systems 1303, and path 1302 linked separately to the gateway by wireless communication systems 1304. The network includes a data aggregator 1311 capable of transmitting payload capacity at rates equal, or exceeding, the sum of the data rates of the two links 1301 and 1302. The data aggregator 1311 provides terminal device 1312 with communication data from both links 1301 and 1302. In this manner, although two separate links 1301, 1302 are shown, any suitable number of separate links may be implemented and combined to achieve higher data rate throughput. Because the bandwidth of each wireless link 1301, 1302 is not impacted by other adjacent wireless links, it is conceivable that an application may aggregate multitudes of separate links, such as E-Band and/or V-Band links, to create data rates in excess of one terabit per second and above.

The wireless network shown in FIG. 16 may include any of the wireless communication systems, e.g., systems 100, 4000, 4400, 5000, 7000, disclosed herein and any of the other disclosed network components described in connection with the other figures. The data aggregator 1311 may be implemented in software and/or firmware running on a terminal device, server, gateway, or wireless communication system.

Figure 17:
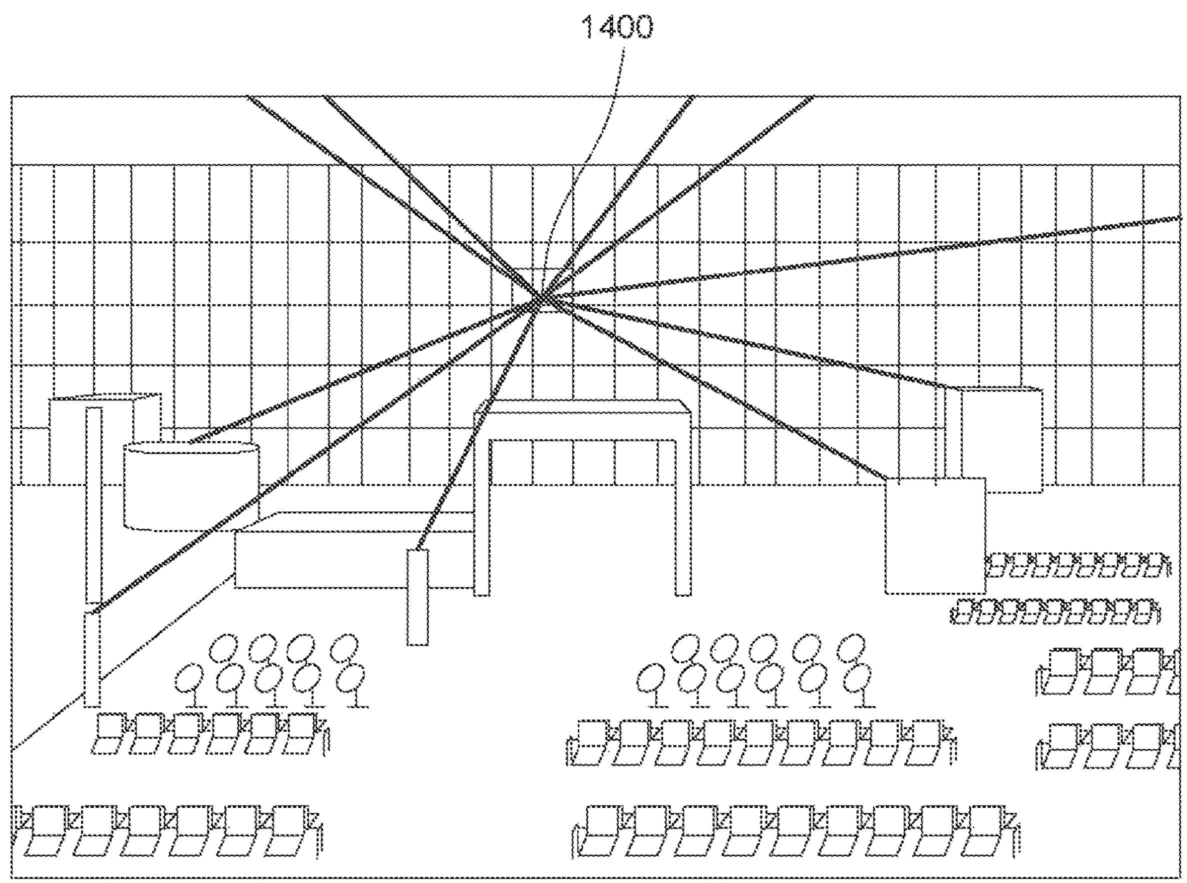
FIG. 17 is a contextual schematic illustration of an exemplary wireless router.

FIG. 17 is a contextual schematic illustration of an exemplary wireless router 1400 in an example indoor environment, such as an airport terminal. The router 1400 may include any of the disclosed wireless communication systems, e.g., systems 100, 4000, 4400, 5000, 7000. A plurality of PAAX can be combined in the wireless router 1400 which provides robust, high-speed communications to a large public area, such as a waiting area in an airport terminal. The wireless router 1400 connects to a distant transceiver by a communication beam (shown on upper right). The V-Band PAAX may employ 802.11ay to communicate with a plurality of terminal devices. The user terminal devices may be any of those disclosed herein. The wireless router 1400 may include an E-Band PAAX and a plurality of V-Band PAAX. A single PAAX can serve multiple end user terminal devices, using agile beamsteering and TDMA. The V-Band PAAX may employ 802.11ay to communicate with one or more end user devices using V-Band.

Figure 18:
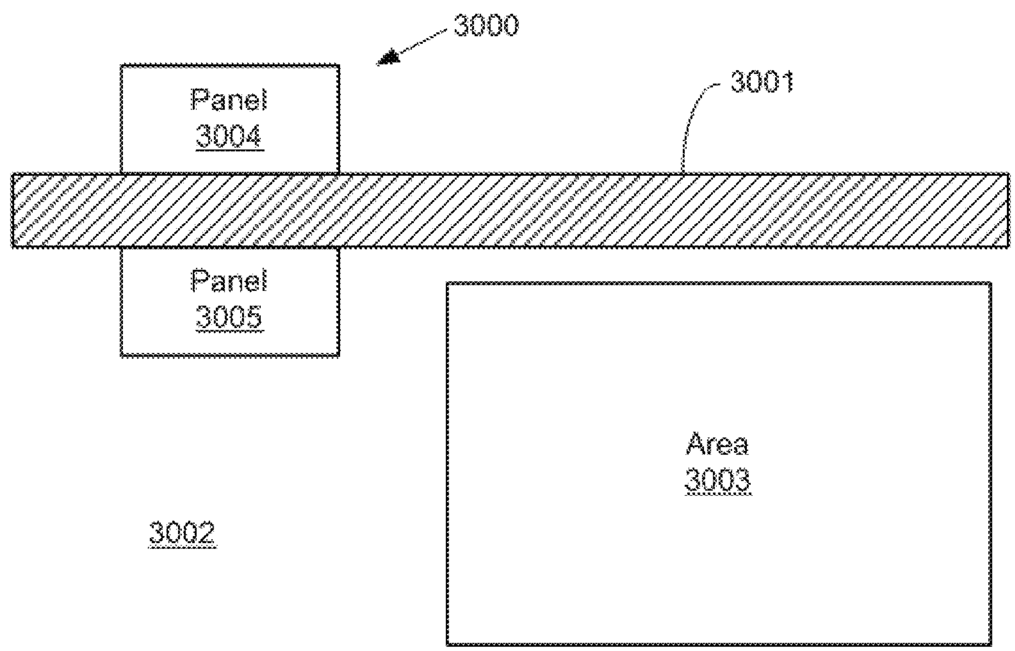
FIG. 18 is a contextual schematic plan view of a first exemplary wireless communication system having at least one rotatable support, which system is includable in the wireless networks disclosed herein.

FIG. 18 is a contextual schematic plan view of a first exemplary wireless communication system 3000 having a rotatable support, which system 3000 is includable in the wireless networks disclosed herein. The system 3000 may include any of the wireless communication systems disclosed herein configured to include at least one rotatable panel or support, as described here. The support may be a panel or any other suitable means of support, including those means disclosed above herein. FIG. 18 is a top view of two rooms separated by a wall 3001 on which a wireless communication system 3000 is mounted. The system 3000 includes a panel 3004 servicing room 1 and an adjustable panel 3005 servicing room 2 3002. The panel 3004 may connect the wireless communication system 3000 with a mm-wave gateway in an adjacent room, while the panel 3005 may distribute a local wireless network service, e.g., WiFi, WiGig or the like, or other connectivity to terminal devices within room 2 3002. The challenge in this scenario is to provide coverage over an area that includes the portion of room 2 immediately adjacent to the wall panel 3005, such as area 3003. The end terminal devices in area 3003 may not be able to obtain service from system 3000, due to the directional nature of mm-wave signals emanating from the panel 3005. Such directional signals may be limited to an angle incident with a surface of panel 3005, for example, 45 degrees or less. Thus, devices located outside of this angle (such as those located in area 3003) generally may not be able to efficiently communicate with the system 3000.

Figure 19:
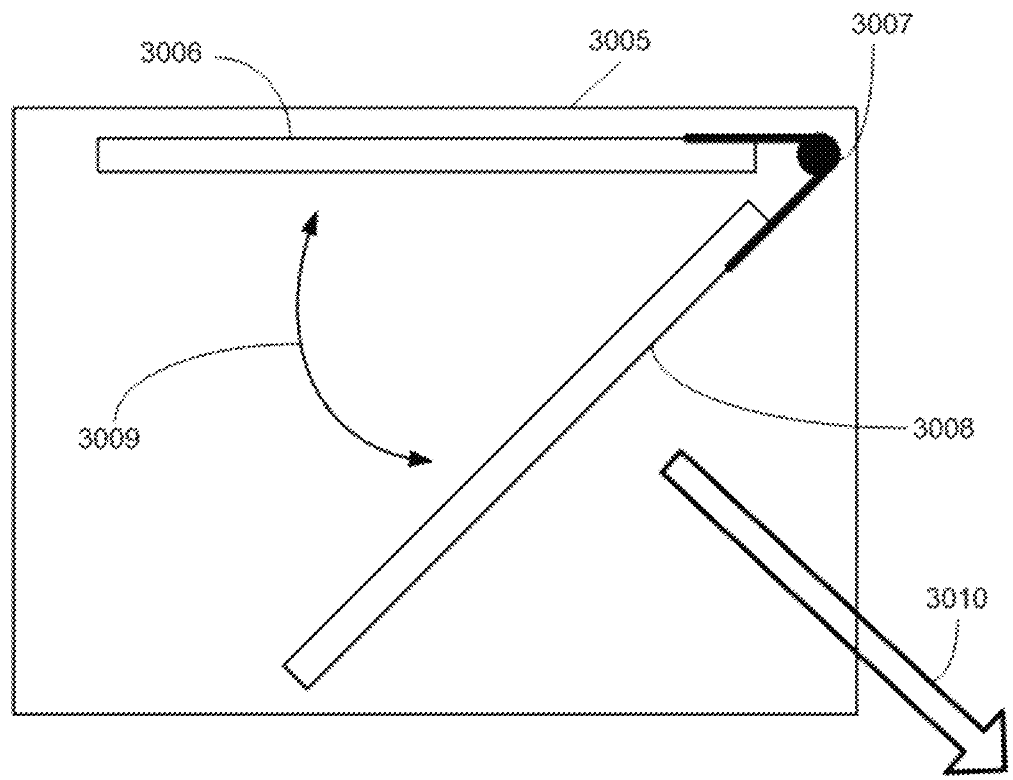
FIG. 19 is a schematic plan view showing details of the wireless communication system shown in FIG. 18.

FIG. 19 is a schematic top plan view showing details of the wireless communication system 3000 shown in FIG. 18. In order to address the coverage issue described above, the adjustable panel 3005 includes a means for rotating the direction of the panel 3005 so that the direction of the wireless signals to/from the panel 3005 can be changed and adjusted to a desired position. Any suitable structure can be employed for rotating or adjusting the angle or the panel 3005. For example, the panel 3005 may include two supports, e.g., sub-panels 3006, 3008, joined together, in this example, by hinge or pivot 3007 on one side or end of the sub-panels 3006, 3008. The sub-panel 3006 may act as a mount, being mounted to the wall 3001, and the sub-panel 3008 may be moved about hinge 3007. Sub-panel 3008 may include a PAAX which radiates/receives signal 3010 into a laterally-adjacent area of panel 3005 when the hinge 3007 is open, for example, area 3003 or FIG. 18, while another PAAX located on sub-panel 3006 may radiate/receive signals to/from panel 3004 through wall 3001. The hinge 3007 allows manual adjustment of an angle 3009 formed between the two sub-panels 3006, 3008. Adjustment of the angle allows the coverage area to be directed to any desired direction.

The sub-panels 3006, 3008 may be hinged together on the sub-panel right sides, as shown in FIG. 19, on the left sides, or center. Furthermore, a selectable dual-hinge may be deployed, which includes one hinge on each end of the sub-panels, allowing one sub-panel to swivel around either hinge by removing or disconnecting the unused hinge pin, thus allow one sub-panel to swivel around the axis of the other hinge pin that remains.

The hinge 3007 may include a conventional hinge structure having a pin connecting two or more flanges so that they may be rotated about the axis of the pin. The hinge 3007 may be implemented with frictional engagement in order to hold the sub-panels 3006, 3008 in a desired angle to each other, or other means can be used to achieve a fixed, angular relationship between the sub-panels, such as with one or more clamps, pins, adjustment bars, screws, or other physical constraints in order to assure that the desired angle between the sub-panels be permanently or adjustably maintained. Moreover, it should be understood that communication signals may be routed between sub-panel 3006 and 3008 via wired or wireless means, such as a flex cable or flex board having one or more traces connecting electrical components located on either sub-panel 3006, 3008.

The hinge 3007 may be mounted on different ends or sides of the sub-panels 3006, 3008.

During installation of adjustable panel 3005, angle 3009 may be set manually by an installation technician and then beamsteering techniques may be used to further adjust the exact direction of the signal 3010, if necessary. Adding a means of physically rotating the panel allows rapid compensation for geometric variations due to phenomena such as wind sway of a wall on which the system 3000 has been mounted. In some circumstances, narrow, pencil beam wireless signals may have widths on the order of one degree, and compensating for such variations in panel positioning so as to more precisely direct wireless signals may be desirable.

The panel 3004 may also be an adjustable panel including the components of panel 3005 shown in FIG. 19.

In some situations, a further motivation for being able to adjust angle 3009 may be that radiated power varies as the electrical beamformer nears the extremes of its angular range. Depending on exact design of the beamformer elements, said variation can exceed 40%.

Figure 20:
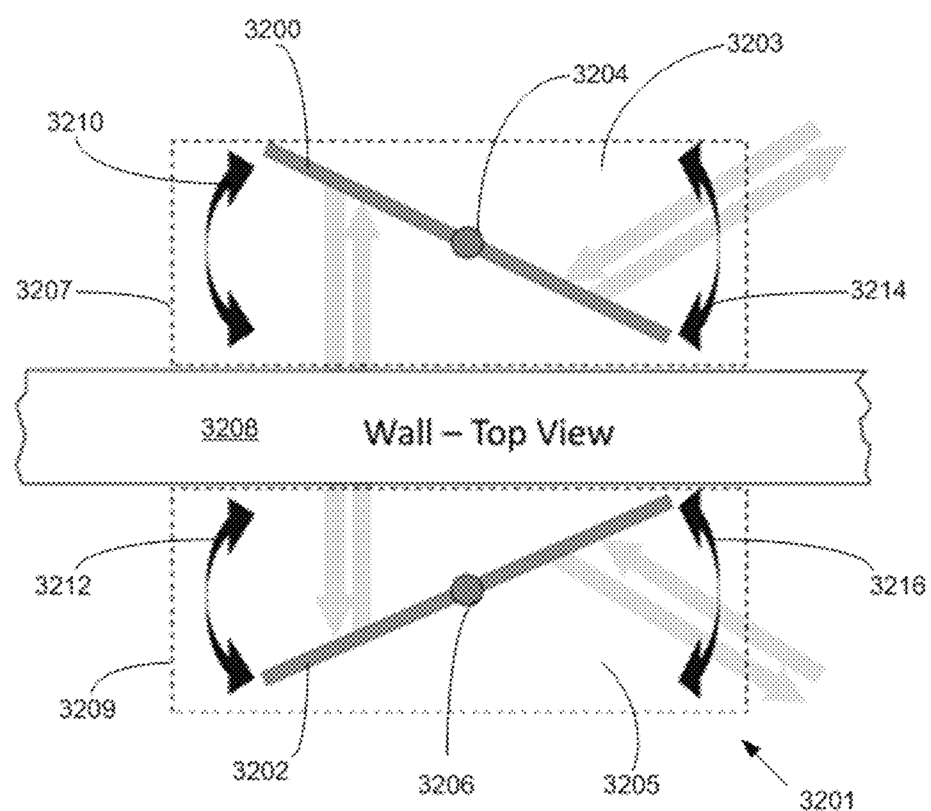
FIG. 20 is a schematic plan view of a second exemplary wireless communication system having rotatable supports, which system is includable in the wireless networks disclosed herein.

FIG. 20 is a schematic top plan view of a second exemplary wireless communication system 3201 having rotatable supports 3200, 3202, which system 3201 is includable in the wireless networks disclosed herein. The system 3201 may include any of the wireless communication systems disclosed herein configured to include at least one rotatable panel or support, as described here. The system 3201 include panels 3203, 3205. The panels 3203, 3205 each include a housing 3207, 3209 that may be mounted to opposite sides of the wall 3208. The rotatable supports 3200, 3202 are each rotatably mounted to their respective housing 3207, 3209 by way of pivots 3204, 3206, respectively.

Each of the supports 3200, 3202 are rotatably mounted to a pivot 3204 and 3206, respectively, near the lateral midpoint of each support, where pivot 3204 and 3206 each comprises a post, pin or other fixed, physical structure that allows the supports to rotate about a respective axis of each pivot. Each support 3200, 3202 may include two or more PAAXs, at least one room-facing PAAX mounted on one side of a support for communicating with terminal devices in a room and at least one wall-facing PAAX mounted on the opposite side of each support for providing communications through wall 3208. The wall-facing PAAXs may require beamsteering techniques, as the angle of the supports with respect to one another is not parallel. The physical angle 3210 and 3212 of each support with respect to wall 3208 may change the transmission/reception angles 3214 and 3216, respectively, formed by electronic beamforming techniques, thus allowing communications with end devices and/or other panels located in areas near wall 3208.

The housings 3207, 3209 may each be any suitable structure for mounting the panels to the wall 3208 while permitting the supports to rotate. For example, each housing may be a plastic or metal box frame having an open faces exposing the PAAXs. In other configurations the housings may be fully enclosed boxes or containers.

Figure 21:
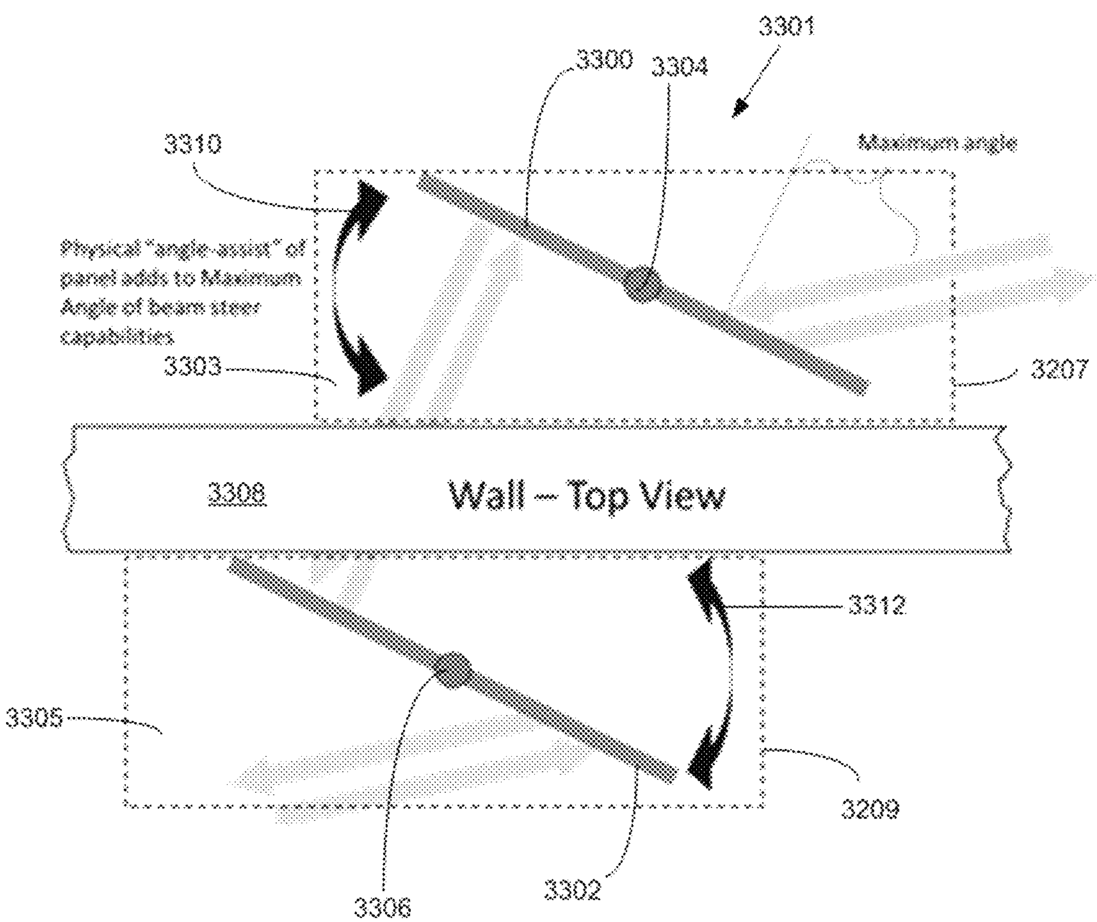
FIG. 21 is a schematic plan view of a third exemplary wireless communication system having rotatable supports, which system is includable in the wireless networks disclosed herein.

FIG. 21 is a schematic top plan view of a third exemplary wireless communication system having rotatable supports, which system is includable in the wireless networks disclosed herein. The system 3301 may include any of the wireless communication systems disclosed herein configured to include at least one rotatable panel or support, as described here. The system 3301 includes panels 3303 and 3305. As in FIG. 20, each of the supports 3300, 3302 in this configuration is rotatably mounted to a pivot 3304 and 3306, respectively, near the lateral mid-point of each panel, where pivot 3304 and 3306 may each include a post, pin or other fixed, physical structure that allows the supports to rotate about a respective axis of each pivot point. Also similar to FIG. 20, each support typically includes two or more PAAXs, at least one room-facing PAAX mounted on one side of a support for communicating with devices in a room and at least one wall-facing PAAX mounted on the opposite side of each support for providing communications through wall 3308. The physical angle 3310 and 3312 of each support, respectively, with respect to wall 3308 adds to the transmission/reception angle possible by electronic beamforming techniques, thus allowing communications with devices and/or other panels located in areas near wall 3308.

In the configuration shown in FIG. 21, the two panels are not aligned directly with each other. Rather, they are staggered horizontally from each other as shown, in order to reduce the angle to transmit/receive signals through wall 3308 from the surface of each support. In other words, no beamsteering is needed in this arrangement, as the wall-facing PAAX on both supports are generally parallel to each other. In other configurations, the panels may be staggered vertically or in any suitable orientation between horizontal and vertical.

Figure 22:
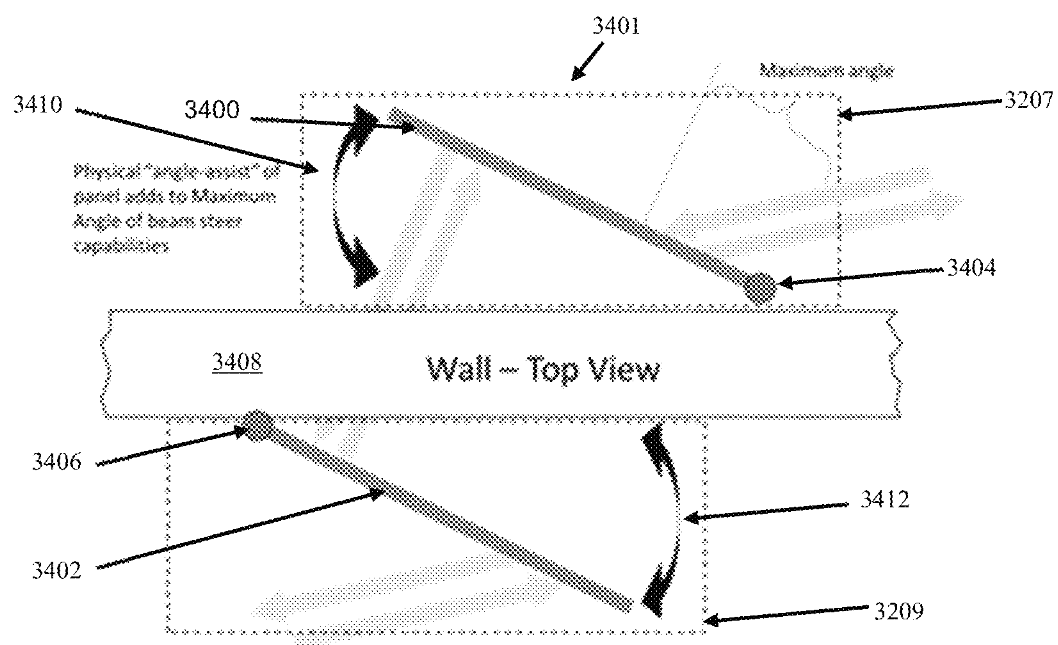
FIG. 22 is a schematic plan view of a fourth exemplary wireless communication system having rotatable supports, which system is includable in the wireless networks disclosed herein.

FIG. 22 is a schematic top plan view of a fourth exemplary wireless communication system 3401 having rotatable supports 3402, 3400, which system 3401 is includable in the wireless networks disclosed herein. The system 3401 may include any of the wireless communication systems disclosed herein configured to include at least one rotatable panel or support, as described here. The system 3401 include panels 3403, 3405 mountable on opposing sides of wall 3408. The panels 3403, 3405 each include a housing 3207, 3209 that may be mounted to opposite sides of the wall 3408. The rotatable supports 3402, 3400 are each rotatably mounted to their respective housing 3207, 3209 by way of pivots 3404, 3406, respectively.

In the system 3401, each support 3400, 3402 is rotatably coupled to pivots 3404 and 3406, respectively, on one side of each panel at the ends of supports 3400, 3402, where pivot 3404 and 3406 each comprises a post, pin or other fixed, physical structure that allows the supports to rotate about a respective axis of each pivot. Each support 3400, 3402 may include two or more PAAXs, at least one room-facing PAAX mounted on one side of a support for communicating with end devices in a room and at least one wall-facing PAAX mounted on the opposite side of each support for providing communications through wall 3308. As with the other systems described in connection with FIGS. 18-21, the physical angle 3410 and 3412 of each support, respectively, with respect to wall 3408 expands the transmission/reception angle possible by electronic beamforming techniques, thus allowing communications with devices and/or other panels located in areas near wall 3408.

Similar to the system shown in FIG. 21, each of the panels are staggered from one another horizontally on wall 3408, in order that the signals transmitted and received by the panels do not require beamsteering techniques, as the panels are generally parallel with each other. In other configurations, the panels may be staggered vertically or in any suitable orientation between horizontal and vertical.

Figure 23:
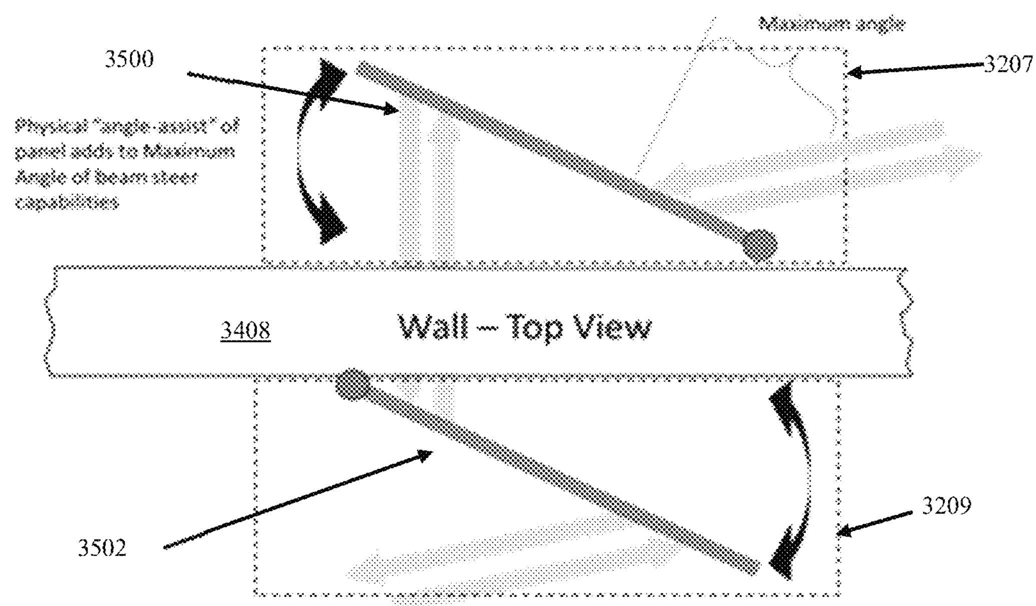
FIG. 23 is a schematic plan view of a fifth exemplary wireless communication system having rotatable supports, which system is includable in the wireless networks disclosed herein.

FIG. 23 is a schematic plan view of a fifth exemplary wireless communication system 3501 having rotatable supports 3500, 3502, which system 3501 is includable in any of the wireless networks disclosed herein. The system 3501 combines some of the features of FIGS. 20 and 22, where each of the supports 3500, 3502 are pivotally mounted to a pivot along one end of the support, and the panels are mounted on the wall in alignment with each other, rather than staggered. Generally, the signals transmitted and received between of the panels require beamsteering techniques, as the supports 3500, 3502 are not always parallel with each other.

Figure 24:
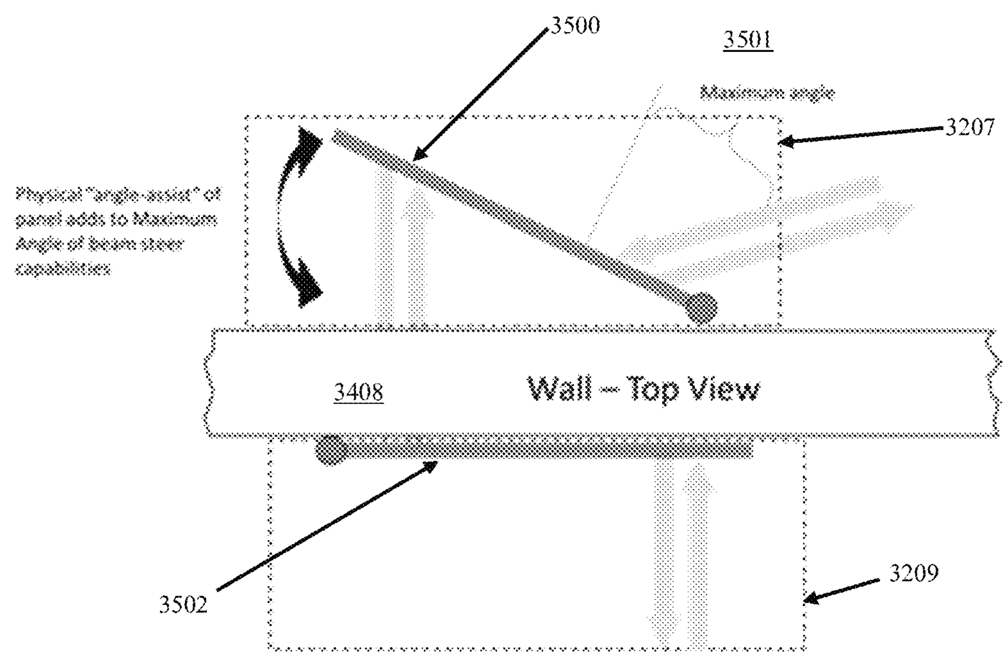
FIG. 24 is a schematic plan view of the fifth exemplary wireless communication system having rotatable supports where one of the panels is in a closed position.

FIG. 24 is a schematic plan view of the fifth exemplary wireless communication system 3501 having rotatable supports 3500, 3502 where one of the supports 3502 is in a closed position.

Similar to the systems shown in FIGS. 22 and 23, each of the supports are pivotally mounted to respective pivots 3404 and 3406. However, in this example, support 3500 is positioned at an angle to the wall, while support 3502 is positioned parallel to the wall. This arrangement generally requires no beamsteering for signals transmitted or received from/by a wall-facing PAAX located on the wall side of support 3502, and also no beamsteering techniques for communications with devices located in a room where support 3502 is located. On the other hand, a wall-facing PAAX mounted on one side of support 3500 generally transmits and receives signals using beamsteering techniques, due to the non-parallel relationship between supports 3500 and 3502. Beamsteering may or may not be used by a PAAX located on the opposite side of support 3500 to communicate with devices in a room where support 3500 is located.

In any of the adjustable wireless communication systems disclosed herein, one or more supports of the system may be electronically moved to a desired angle by the use of an electric motor mounted to the panel using conventional mounting techniques. Use of an electric motor may allow angle changes when needed to account for traffic conditions, outages in the network, or the like. During installation of a wireless communication system, the motor may be automatically controlled to position the supports in the most desirable angle in accordance with, for example, sample traffic generated by other wireless communication systems and/or end user devices. The physical angle at which each support resides can be measured by angle detection circuitry, such as commercially-available circuitry, and provided as part of beamsteering calculations.

In any of the systems described herein, a plurality of PAAXs may be used within one or more panels in order to increase the coverage range and/or area.

It should be understood that in various configurations of the systems described herein, the PAAXs may operate in one or more millimeter-wave bands in the range between 10 GHz and 300 GHz. Although specific embodiments described above may refer to E-band, V-band, WiGig, or the like, the concepts taught herein may be generally applicable to any millimeter-wave frequencies.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, rather than sequentially. In addition, while certain aspects of this disclosure are described as being performed by a single module or component for purposes of clarity, it should be understood that the functions described in this disclosure may be performed by any suitable combination of components or modules associated with a wireless data communication network or system.

The foregoing description is illustrative and not restrictive. Although certain exemplary embodiments have been described, other embodiments, combinations and modifications involving the invention will occur readily to those of ordinary skill in the art in view of the foregoing teachings. Therefore, the invention is to be limited only by the following claims, which cover one or more of the disclosed embodiments, as well as all other such embodiments and modifications when viewed in conjunction with the above specification and accompanying drawings.

What is claimed is:

1. A system, comprising:

a first support;

a second support;

a first phased array antenna mounted to the first support so that the first phased array antenna faces away from the second support;

a second phased array antenna mounted to the first support so that the second phased array antenna faces toward the second support;

a third phased array antenna mounted to the second support so that the third phased array antenna faces toward the first support;

a fourth phased array antenna mounted to the second support so that the fourth phased array antenna faces away from the first support;

a first controller mounted to the first support, configured to pass data between the first phased array antenna and the second phased array antenna;

a first local wireless interface, mounted to the first support and operatively coupled to the controller, configured to wirelessly communicate at least a portion of the data to a first group of one or more local devices;

a second controller mounted to the second support, configured to pass data between the third phased array antenna and the fourth phased array antenna;

a second local wireless interface, mounted to the second support and operatively coupled to the second controller, configured to wirelessly communicate at least a portion of the data to a second group of one or more local devices; and a pivot to allow at least one of the first support or the second support to rotate;

wherein the second phased array antenna and third phased array antenna are configured to unidirectionally communicate millimeter wave signals from the second phased array antenna to the third phased array antenna;

wherein the second phased array antenna and third phased array antenna are configured to communicate the millimeter wave signals through an obstruction that attenuates the millimeter wave signals.

2. The system of claim 1, wherein the first support and the second support are each configured to be located on opposite sides of the obstruction.

3. The system of claim 2, wherein the obstruction is selected from the group consisting of a building wall, building floor, a barrier, and any combination of the foregoing.

4. The system of claim 2 wherein the first support and the second support are configured to be aligned with each other when located on opposite sides of the obstruction.

5. The system of claim 2, wherein the first support and the second support are configured to be staggered relative to each other when located on opposite sides of the obstruction.

6. The system of claim 1, wherein the first support includes a first pivot for allowing the first support to rotate about the axis of the first pivot, and the second support includes a second pivot for allowing the first support to rotate about the axis of the first pivot.

7. The system of claim 6, wherein the first pivot is located at or near an end of the first support, and the second pivot is located at or near an end of the second support.

8. The system of claim 7, wherein the first pivot is located at or near the end of the first support that is opposite the end of the second support at which second pivot is located.

9. The system of claim 6, wherein the first pivot is located at or near the center of the first support, and the second pivot is located at or near the center of the second support.

10. The system of claim 1, further comprising:

a fifth phased array antenna mounted to the first support so that the fifth phased array antenna faces toward the second support; and a sixth phased array antenna mounted to the second support so that the sixth phased array antenna faces toward from the first support.

11. A method of wireless communication, comprising:

rotating a support having a first phased array antenna and a second phased array antenna about a pivot;

receiving at the first phased array antenna a first millimeter wave signal carrying data;

transferring the data through a first transceiver to the second phased array antenna;

transmitting through an obstruction that attenuates millimeter wave signals, using the second phased array antenna, a second millimeter wave signal carrying the data;

wirelessly communicating at least a portion of the data to a first group of one or more local devices via a first local wireless interface mounted to the support;

receiving the second millimeter wave signal at a third phased array antenna located at an opposite side of the obstruction from the second phased array antenna;

transferring the data through a second transceiver to a fourth phased array antenna; and transmitting from the fourth phased array antenna, a third millimeter wave signal carrying the data; and wirelessly communicating at least a portion of the data to a second group of one or more local devices via a second local wireless interface that is operatively coupled to the second transceiver.

12. A system, comprising:

a first support having a first side opposing a second side;

a first phased array antenna, mounted to the first side of the first support, the first phased array antenna adapted to receive a first millimeter wave beam;

a second phased array antenna, mounted to the second side of the first support, the second phased array antenna adapted to emit a second millimeter wave beam;

a first controller, mounted to the first support, configured to pass data received by the first phased array antenna to the second phased array antenna to provide a first communication path in a first direction;

a third phased array antenna, mounted to the first side of the first support, the third phased array antenna adapted to emit a third millimeter wave beam;

a fourth phased array antenna, mounted to the second side of the first support, the fourth phased array antenna adapted to receive a fourth millimeter wave beam;

wherein the first controller is further configured to pass data received by the fourth phased array antenna to the third phased array antenna to provide a second communication path in a second direction;

a first local wireless interface, mounted to the first support and operatively coupled to the first controller, configured to wirelessly communicate at least a portion of data from the first communication path or the second communication path to a first group of one or more local devices;

a second support, not attached to the first support, having a first side opposing a second side;

a fifth phased array antenna, mounted to the first side of the second support, the fifth phased array antenna adapted to receive the second millimeter wave beam emitted from the second phased array antenna;

a sixth phased array antenna, mounted to the second side of the second support, the sixth phased array antenna adapted to emit a fifth millimeter wave;

a second controller, mounted to the second support, configured to pass data received by the fifth phased array antenna to the sixth phased array antenna as part of the first communication path;

a seventh phased array antenna, mounted to the first side of the second support, the seventh phased array antenna adapted to emit the fourth millimeter wave beam towards the fourth phased array antenna;

an eighth phased array antenna, mounted to the second side of the second support, the eighth phased array antenna adapted to receive a sixth millimeter wave beam;

wherein the second controller is further configured to pass data received by the eighth phased array antenna to the seventh phased array antenna as part of the second communication path;

a second local wireless interface, mounted to the second support and operatively coupled to the second controller, configured to wirelessly communicate at least a portion of data from the first communication path or the second communication path to a second group of one or more local devices; and means for rotating at least one of the first support or the second support;

wherein the second phased array antenna and the fifth phased array antenna are configured to transmit and receive, respectively, the second millimeter wave beam through an obstruction that attenuates the second millimeter wave beam and the fourth millimeter wave beam, and the seventh phased array antenna and the fourth phased array antenna are configured to transmit and receive, respectively, the fourth millimeter wave beam through the obstruction.

13. The system of claim 12, wherein the means for rotating includes a mechanism selected from the group consisting of a hinge and a pivot.

14. The system of claim 13, wherein the mechanism is located at an end of the first support or the second support.

15. The system of claim 13, wherein the mechanism is located at or near the center of the first support or the second support.

16. The system of claim 12, wherein the means for rotating includes:

a mount configured to attach to the first support; and a hinge attached to the mount and the first support.

17. The system of claim 12, wherein the first local wireless interface is selected from the group consisting of a millimeter-wave interface and a Wi-Fi interface.

* * * * *